United States Patent
Sugaya et al.

(10) Patent No.: US 7,330,497 B2
(45) Date of Patent: Feb. 12, 2008

(54) WIRELESS COMMUNICATION SYSTEM USING AN IMPULSE SIGNAL TRAIN, A WIRELESS TRANSMISSION APPARATUS, A WIRELESS RECEPTION APPARATUS, A WIRELESS TRANSMISSION METHOD, AND A WIRELESS RECEPTION METHOD

(75) Inventors: Shigeru Sugaya, Kanagawa (JP); Jun Iwasaki, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 11/518,659

(22) Filed: Sep. 11, 2006

(65) Prior Publication Data

US 2007/0002931 A1 Jan. 4, 2007

Related U.S. Application Data

(63) Continuation of application No. 10/138,100, filed on May 2, 2002.

(30) Foreign Application Priority Data

| May 8, 2001 | (JP) | ............................. P2001-137828 |
| Sep. 28, 2001 | (JP) | ............................. P2001-303012 |

(51) Int. Cl.
*H04B 1/00* (2006.01)
(52) U.S. Cl. ..................................................... 375/130

(58) Field of Classification Search ................ 375/130, 375/141, 260, 144, 148, 285; 370/334, 342
See application file for complete search history.

(56) References Cited

U.S. PATENT DOCUMENTS

| 5,610,907 | A | * | 3/1997 | Barrett ........................ 370/342 |
| 6,091,757 | A | | 7/2000 | Cudak et al. |
| 6,400,755 | B1 | | 6/2002 | Harris et al. |
| 6,680,902 | B1 | | 1/2004 | Hudson |
| 6,700,929 | B1 | | 3/2004 | Shan et al. |
| 6,700,939 | B1 | * | 3/2004 | McCorkle et al. .......... 375/295 |
| 2001/0008542 | A1 | * | 7/2001 | Wiebke et al. .............. 375/141 |
| 2001/0053175 | A1 | * | 12/2001 | Hoctor et al. ............... 375/130 |

* cited by examiner

*Primary Examiner*—Khanh C. Tran
(74) *Attorney, Agent, or Firm*—Lerner, David, Littenberg, Krumholz & Mentlik, LLP

(57) ABSTRACT

A wireless communication system performs high-speed and low-speed transmission of information signals for short-distance communication and long-distance communication by using a short spread code and a long spread code, respectively. A wireless transmission unit includes an interface, a buffer, a spreading processor, a UWB wireless transmitter, a controller, a data memory, and an antenna. The controller detects the entry of information signal into the buffer, and then determines the transmission rate depending on the state of wireless linkage and indicates the determined transmission rate to the spreading processor.

6 Claims, 22 Drawing Sheets

TIME

WIRELESS COMMUNICATION SYSTEM USING AN IMPULSE SIGNAL TRAIN, A WIRELESS TRANSMISSION APPARATUS, A WIRELESS RECEPTION APPARATUS, A WIRELESS TRANSMISSION METHOD, AND A WIRELESS RECEPTION METHOD

CROSS-REFERENCE TO RELATED APPLICATIONS

This application is a Continuation of U.S. patent application Ser. No. 10/138,100 filed May 2, 2002, the disclosure of which is hereby incorporated herein by reference.

BACKGROUND OF THE INVENTION

1. Field of the Invention

The present invention relates to a wireless communication system using an impulse signal train, a wireless transmission apparatus, a wireless reception apparatus, a wireless transmission method, and a wireless reception method.

2. Description of the Prior Art

Owing to the recent information communication technology, many offices and homes are introducing LANs. There are increasing demands of wireless LANs which do not require the wiring for the organization of LANs. Ultra wide band (UWB) communication is a wireless communication scheme available for such wireless LANs.

The UWB communication is basically designed to perform the baseband transmission by using a pulse train signal having a very narrow pulse width (e.g., 1 ns or less). It has such an occupied bandwidth of the GHz order that the bandwidth divided by the center frequency (e.g., 1 to 10 GHz) becomes about 1. This bandwidth is extremely wide as compared with the bandwidths used for wireless LANs based on the W-CDMA scheme, CDMA 2000 scheme, SS (spread spectrum) scheme, and OFDM (orthogonal frequency division multiplexing) scheme.

The UWB transmission scheme is less interfering to other wireless communication systems due to its low signal power density, and it is expected to be a technique of overlay on frequency bands which are used by existing wireless communication systems. Moreover, due to its wide band, the UWB transmission scheme is expected to be a technique for the super high-speed wireless transmission of the order of 100 Mbps in the field of personal area network (PAN).

The conventional spread-code based communication system has its information signal bit span fixed depending on the length of spread code, and it is problematic in the difficulty of changing the transmission volume. It can solely perform communication at a fixed transmission rate due to the use of UWB signals which are rendered the spreading process based on a spread code formed in a certain bit span.

Due to the communication ability only at a fixed transmission rate, the conventional communication system involves the following problems.

Primarily, a constant high-speed spread code must be used for communication of any distance and any intended speed, and the efficiency is low.

Among communication of different distances, short-distance communication performs normally, whereas long-distance communication becomes difficult due to the interference by short-distance communication.

In short-distance UWB communication, the integration operation continues needlessly even after the threshold value is reached within the length of spread code. In long-distance communication, the threshold value is not reached in the integration operation for a full length of spread code, and long-distance communication cannot perform.

SUMMARY OF THE INVENTION

The present invention aims at solving the above-mentioned prior art problems, and it is summarized as follows.

According to one aspect of the invention, there is provided a wireless transmission method which is intended for a UWB communication system and designed to switch appropriately between the use of a low-speed information bit with a large spreading factor and the use of a high-speed information bit with a small spreading factor, while retaining the spread code chip rate unchanged in both cases, depending on the distance between the information sending station and the information receiving station and the characteristics of transmission path.

According to another aspect of the invention, there is provided a sequence for controlling appropriately the switching of information bit depending on the transmission distance and transmission characteristics as follows.

(1) The sending station sends a data transmission request having a predetermined large spreading factor to the receiving station.

(2) On receiving the data transmission request, the receiving station estimates the number of bits (number of times of integration) to reach a certain threshold value at which the recognition of information bit is possible, and sends data (number of times of integration) necessary for the de-spreading process as transmission parameter data to the sending station.

(3) On receiving the transmission parameter data, the sending station produces data (number of times of integration) in terms of a spreading factor necessary for the de-spreading process, and carries out the information transmission.

According to another aspect of the invention, there is provided a sequence of band reservation for stream transmission based on the request of band assignment in the form of the above-mentioned transmission parameter to the control station of the wireless network as follows.

(1) The sending station sends a data transmission request having a predetermined large spreading factor to the receiving station.

(2) On receiving the data transmission request, the receiving station estimates the number of bits (number of times of integration) to reach a certain threshold value at which the recognition of information bit is possible, and sends data (number of times of integration) necessary for the de-spreading process by attachment to the band reservation request in the form of transmission parameter data to the network control station.

(3) On receiving the band reservation request, if band reservation is possible, the network control station indicates band assignment data to the sending station and receiving station or throughout the network.

(4) On receiving the band assignment data, the sending station and receiving station produce data (number of times of integration) in terms of a spreading factor necessary for the de-spreading process, and perform information transmission.

According to another aspect of the invention, there is provided a communication method which uses appropriately a low-speed information bit with a large spreading factor without altering the chip rate depending on the distance between the sending station and the receiving station and the characteristics of transmission path.

According to another aspect of the invention, there is provided a wireless transmission method which selects appropriately a high-speed information bit with a small spreading factor, while retaining the chip rate unchanged, depending on the distance between the sending station and the receiving station and the characteristics of transmission path.

According to another aspect of the invention, there is provided a transmission control method which sends from the sending station to the receiving station, prior to the transmission of information, a transmission request packet with a spreading factor which is increased by use of a predetermined spread code, estimates the de-spreading factor based on the recognition of information bit on the part of the receiving station, and sends data of estimation result in the form of transmission parameter from the receiving station to the sending station.

According to another aspect of the invention, there is provided an information transmission method which implements the spreading process based on the spreading factor carried by the transmission parameter. The receiving station, which has received the transmission request packet, estimates the de-spreading factor based on the recognition of information bit and sends a request of transmission band assignment to the network control station. The control station, if assignment is possible, assigns a transmission band in accordance with the parameter and indicates the band assignment to the receiving station.

According to another aspect of the invention, there is provided an information transmission method which performs information transmission from the sending station to the receiving station based on the spreading process with an spreading factor which is in accordance with the above-mentioned transmission parameter.

According to another aspect of the invention, there is provided a wireless communication system for sending an information signal from a sending station to a receiving station by using an impulse signal train, wherein: the sending station implements a spreading process for an information signal by using a spread code which is produced based on a unit spread code, produces an impulse signal train from a spread signal resulting from the spreading process, and transmits the impulse signal train; the receiving station receives the impulse signal train, implements a de-spreading process for the impulse signal train by using a unit de-spread code, and implements an integration process a certain number of times for a de-spread signal resulting from the de-spreading process thereby to reproduce the information signal.

According to another aspect of the invention, there is provided a wireless communication system using an impulse signal train, the system is capable of performing selectively communication at a nominal transmission rate and communication at a transmission rate lower than the nominal transmission rate, performing communication at the nominal transmission rate by using a unit spread code and an information signal having a bit span that is equal to the code length of the unit spread code, and performing communication at the lower transmission rate by using the unit spread code and an information signal having a bit span that is a multiple of the code length of the unit spread code.

According to another aspect of the invention, there is provided a wireless communication system using an impulse signal train, the system is capable of performing selectively communication at a nominal transmission rate and communication at a transmission rate higher than the nominal transmission rate, performing communication at the nominal transmission rate by using a unit spread code and an information signal having a bit span that is equal to the code length of the unit spread code, and performing communication at the higher transmission rate by using the unit spread code and an information signal having a bit span that is a fraction of the code length of the unit spread code.

According to another aspect of the invention, there is provided a wireless transmission apparatus which performs communication by using an impulse signal train. The apparatus comprises a spread processor which implements a spreading process for an information signal by using a spread code which is produced based on a unit spread code, and a wireless transmitter which produces an impulse signal train from a spread signal resulting from the spreading process, and transmits the impulse signal train.

According to another aspect of the invention, there is provided a wireless reception apparatus which performs communication by using an impulse signal train. The apparatus comprises a wireless receiver which receives an impulse signal train and implements a de-spreading process for the impulse signal train by using a unit de-spread code, and an integration processor which implements an integration process a certain number of times for a de-spread signal resulting from the de-spreading process.

According to another aspect of the invention, there is provided a method of wireless communication for sending an information signal from a sending station to a receiving station by using an impulse signal train. The method comprises a sending operation of implementing a spreading process for an information signal by using a spread code which is produced based on a unit spread code, producing an impulse signal train from a spread signal resulting from the spreading process, and transmitting the impulse signal train, and a receiving operation of receiving the impulse signal train, implementing a de-spreading process for the impulse signal train by using a unit de-spread code, and implementing an integration process a certain number of times for a de-spread signal resulting from the de-spreading process.

According to another aspect of the invention, there is provided a method of wireless communication using an impulse signal train and performing selectively communication at a nominal transmission rate and communication at a transmission rate lower than the nominal transmission rate. The method performs communication at the nominal transmission rate by using a unit spread code and an information signal having a bit span that is equal to the code length of the unit spread code, and performs communication at the lower transmission rate by using the unit spread code and an information signal having a bit span that is a multiple of the code length of the unit spread code.

According to another aspect of the invention, there is provided a method of wireless communication using an impulse signal train and performs selectively communication at a nominal transmission rate and communication at a transmission rate higher than the nominal transmission rate. The method performs communication at the nominal transmission rate by using a unit spread code and an information signal having a bit span that is equal to the code length of the unit spread code, and performs communication at the higher transmission rate by using the unit spread code and an information signal having a bit span that is a fraction of the code length of the unit spread code.

According to another aspect of the invention, there is provided a method of wireless transmission using an impulse signal train. The method comprises the operations of implementing a spreading process for an information signal by using a spread code which is produced based on a unit spread code, producing an impulse signal train from a spread signal resulting from the spreading process, and transmitting the impulse signal train.

According to another aspect of the invention, there is provided a method of wireless reception using an impulse signal train. The method comprises the operations of receiving an impulse signal train, implementing a de-spreading process for the impulse signal train by using a de-spread code, and implementing an integration process a certain number of times for a de-spread signal resulting from the de-spreading process.

According to another aspect of the invention, a short spread code is used for short-distance communication so that a small number of integrating operations take place across the information bit span, thereby performing communication at a high transmission rate, and a long spread code is used for long-distance communication so that a large number of integrating operations take place across the information bit span, thereby performing communication at a low transmission rate.

A long spread code is as long as a multiple of the length of basic spread code, and communication between long-distance stations is performed by use of an information bit which is based on the long spread code.

A short spread code is as short as a fraction of the length of basic spread code, and communication between short-distance stations is performed based on the faster UWB signal.

According to another aspect of the invention, which is intended for a wireless network in which a number of wireless communication apparatus are in wireless linkage, there is accomplished communication at different transmission rates depending on the state of linkage and the transmission quality of each link, while using a same spread code.

Other and further objects, features and advantages of the invention will appear more fully from the following description.

DETAILED DESCRIPTION OF THE PREFERRED EMBODIMENTS

Embodiments of this invention will be explained with reference to the drawings.

First Embodiment

Network Organization

Figure 1:
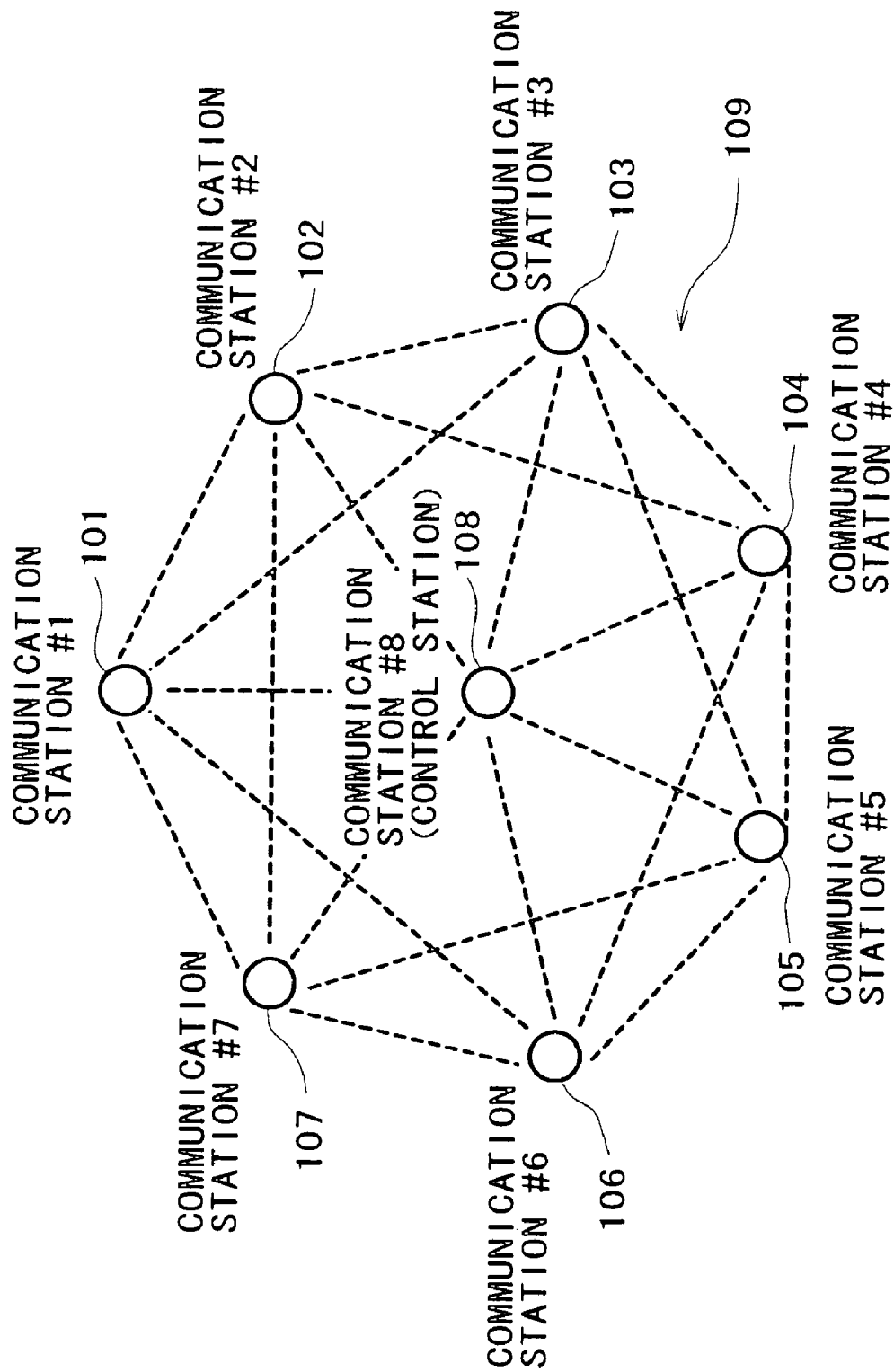
FIG. 1 is a diagram showing the organization of a wireless communication network to which the wireless communication system based on a first embodiment of this invention can be applied.

FIG. 1 shows an example of wireless network to which the communication system of this embodiment can be applied. The wireless network is organized to include a number of communication stations 101, 102, . . . , 108 in wireless linkage. The communication station (#8) 108 has a function of network control station, and other stations (#1) 101, (#2) 102, . . . , (#7) 107 perform communication in accordance with control data sent from the control station (#8) 108. Each of these communication stations has a wireless transmission unit and a wireless reception unit, although the network may include stations having only wireless transmission units and stations having only wireless reception units in carrying out the present invention.

The following explanation assumes communication from the station (#1) 101 to other stations. The station (#1) 101 performs communication to the station (#2) 102, station (#7) 107 and station (#8) 108 which are relatively close to the self station by using a spread impulse signal at one transmission rate (will be called nominal transmission rate).

The station (#1) 101 transmits information signals with the rendition of spreading process at a transmission rate lower than the nominal transmission rate to the station (#3) 103 and station (#6) 106 which are relatively distant from the self station. The station (#4) 104 and station (#5) 105 are too distant for the station (#1) 101 to perform direct communication.

The station (#1) 101 performs communication to the stations (#2-#7) 102-107 at transmission rates that depend on the distance to these stations. The station (#8) 108, which has a virtually equal distance to all other stations (#1-#7) 101-107 can communicate with these stations at the nominal transmission rate.

Transmission Frame

Figure 2:
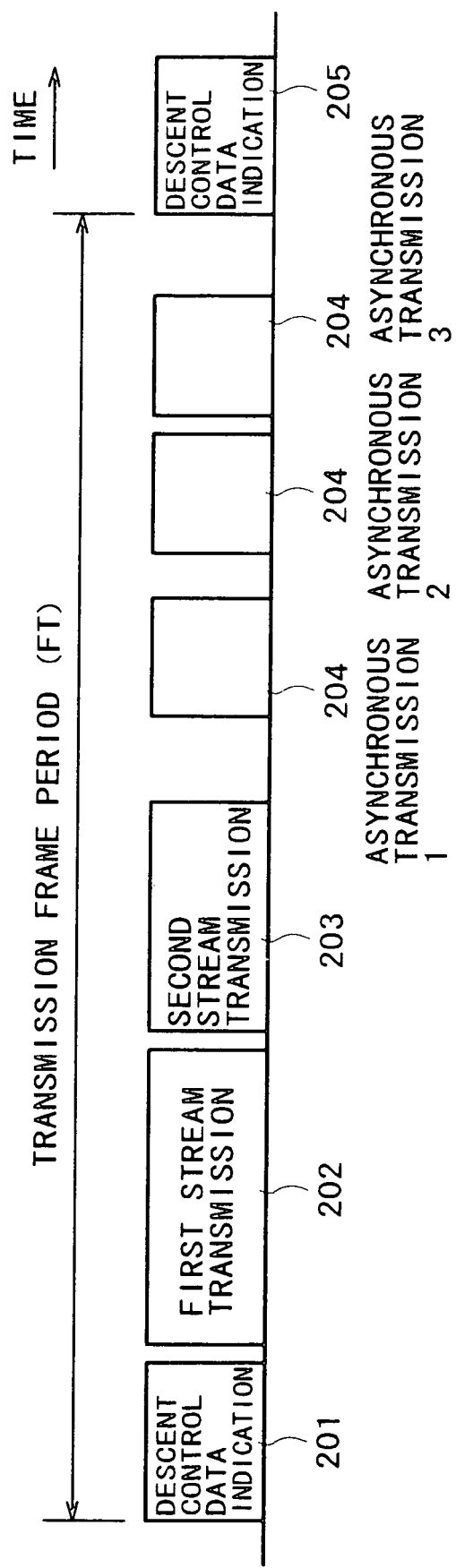
FIG. 2 is a diagram showing an example of the form of transmission frame used by the wireless communication system.

FIG. 2 shows an example of transmission frame adopted by this wireless communication system. The transmission frame has a cyclic period FT. The transmission frame includes a descent control data indication section 201 located at the top, which contains common control data of the network. It is followed by a first stream transmission section 202 and second stream transmission section 203. These stream transmission sections are assigned based on the right of using the same sections of every frame requested by stations.

The stream transmission sections are followed by asynchronous transmission sections which are based on such access control schemes as CSM A/CA. In this example, asynchronous transmission 1, asynchronous transmission 2 and asynchronous transmission 3 take place on detecting the absence of information signal transmission from other transmission units.

Wireless Transmission Unit

Figure 3:
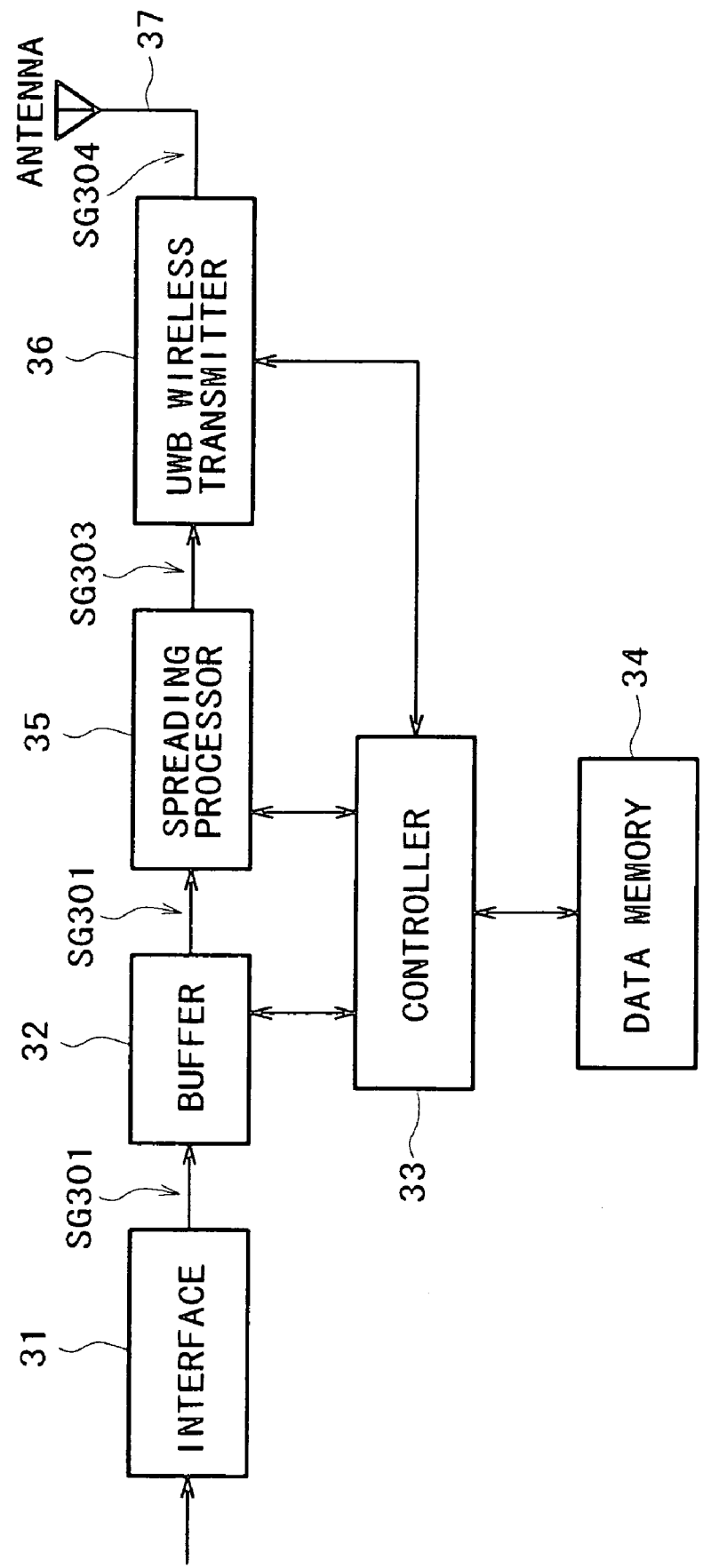
FIG. 3 is a block diagram showing an example of the arrangement of the wireless transmission unit of the first embodiment.
Figure 4A:
FIG. 4 is waveform diagram of the signals produced in the wireless transmission unit of the first embodiment.
Figure 4B:
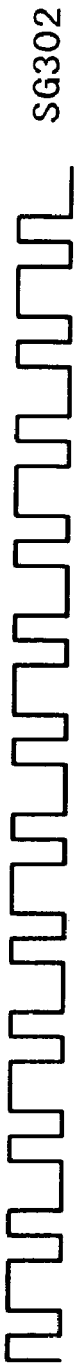
Figure 4C:
Figure 4D:
Figure 4E:
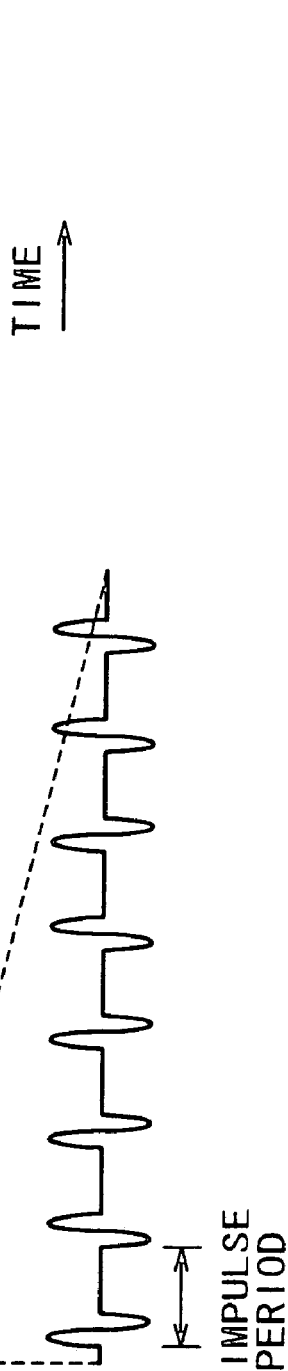

The operation of the wireless transmission unit will be explained with reference to FIG. 3 and FIG. 4. FIG. 3 shows the wireless transmission unit based on this embodiment, and FIG. 4 shows the waveform of signals produced in the transmission unit.

The transmission unit includes an interface 31, a buffer 32, a spread processor 35, a UWB wireless transmitter 36, a controller 33, a data memory 34, and an antenna 37. The interface 31 receives an information signal from an external appliance (e.g., information equipment such as a computer, or video equipment such as a VTR and TV receiver), and puts the signal into the buffer 32, which holds the signal temporarily.

At wireless transmission of information held in the buffer 32, the controller 33 operates on the UWB wireless transmitter 36 to send a transmission request to the receiving station and receive transmission parameter data which is sent back from the receiving station in response to the request, and determines the information transmission rate in accordance with the transmission parameter data. The transmission request is sent as a certain spread code at a predetermined transmission rate. The determination of transmission rate can be based on the use of a parameter which is specified by the wireless network control station for example.

The controller 33 is connected to the data memory 34. The data memory 34 stores spread code data of all communication stations in the wireless network, common spread code data used for access control, and other data necessary for communication. These data are written to and read out of the data memory 34 under control of the controller 33. The controller 33 can be a central processing unit (CPU), which implements predetermined control operations in accordance with programs stored in a memory device (not shown), e.g., EEPROM (Electrically Erasable Programmable Read-Only Memory).

The manner of transmission rate determination by the controller 33 can be based on the predetermined correspondence between receiving stations and transmission rates, or can be based on the record of wireless linkage state in the past. The data memory 34 stores linkage data in the past and spread codes used in the system. The controller 33 releases data of the determined transmission rate and spread code to the spread processor 35.

The spread processor 35 which has received the transmission rate data and spread code initiates the spreading process. Initially, it implements the spreading process for the information signal SG301 released by the buffer 32 by using the spread code signal SG302 thereby to produce a spread signal SG303 based on the determined transmission rate. The spread signal SG303 produced by the spread processor 35 is put into the UWB wireless transmitter 36.

The UWB transmitter 36 produces a periodical impulse signal SG304 having its phase varied in response to the logical level of the spread signal. Alternatively, the impulse signal may be produced based on the pulse position modulation scheme which varies the position of impulses in response to the logical level of the spread signal.

The UWB transmitter 36 feeds the impulse signal SG304 to the antenna 37, which then transmits the radio wave signal.

Sequence for Controlling Information Transmission Rate

Figure 5:
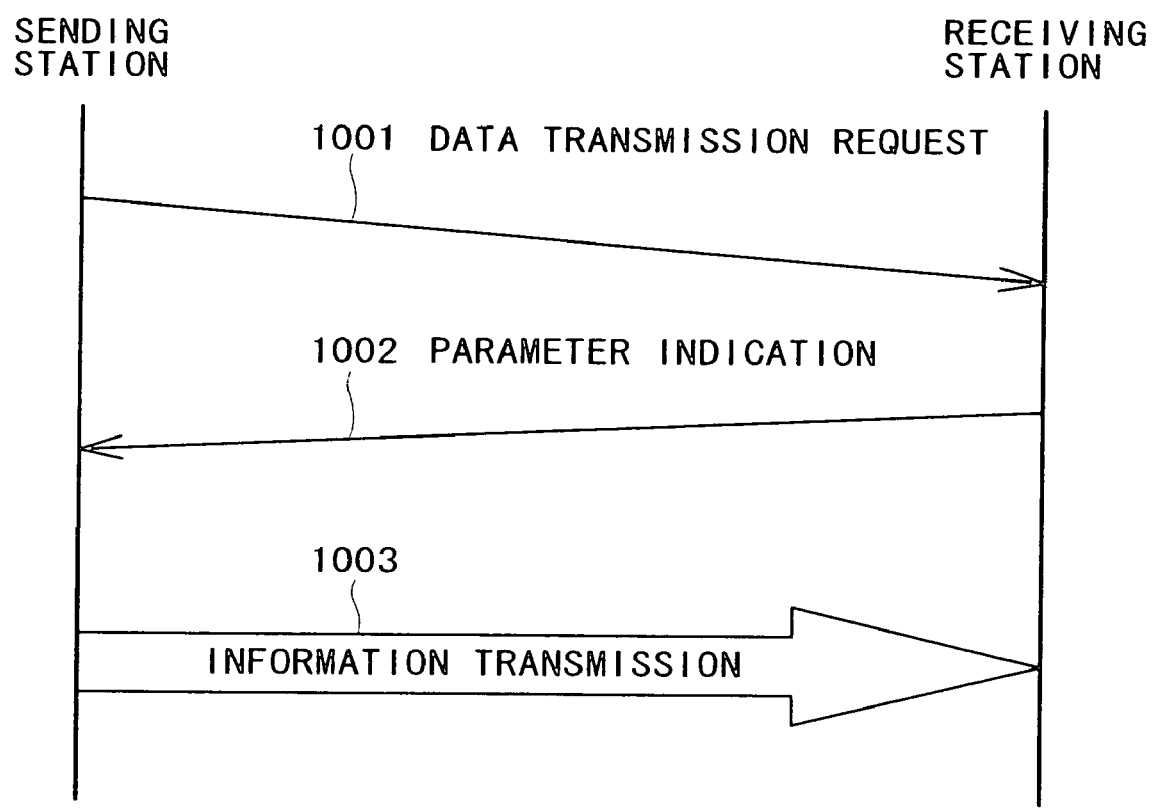
FIG. 5 (FIG. 10) is a diagram showing an example of sequence which covers from transmission of data transmission request up to transmission of information.

FIG. 5 (FIG. 10) shows an example of sequence which covers from transmission of data transmission request up to transmission of information.

In case the sending station has made a judgement of the necessity of wireless transmission, it sends a data transmission request 1001 to the receiving station. A conceivable manner of transmitting the data transmission request 1001 is the use of a low-speed transmission rate which is derived from a number of spread codes which are prevalent among all communication stations in the network, although other manner may be used.

The receiving station, which has received the data transmission request 1001, operates on its integration processor 83? and controller 84? in the wireless reception unit to estimate the number of times of integration by which the specified threshold value is reached for the signal of data transmission request 1001. The receiving station sends parameter data 1002 which carries the number of times of integration to the sending station.

The sending station, which has received the parameter data 1002, implements the spreading process for the information bit based on the parameter (number of times of integration) specified in the data 1002. Namely, it uses a series of spread code equal in number to the number of times of integration to spread the information bit to make a bit length equal to the length of spread code series. Following the spreading process, information transmission 1003 takes place.

Transmission Frame Applicable to this Embodiment

Figure 6:
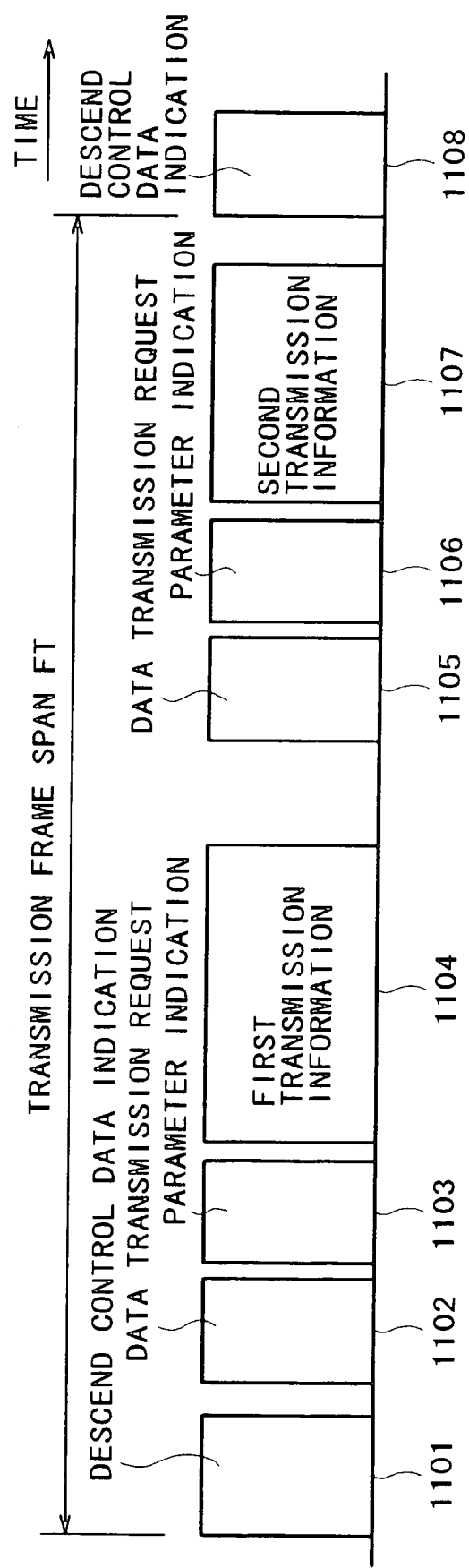
FIG. 6 (FIG. 11) is a diagram showing an example of the form of transmission frame applicable to the information transmission sequence shown in FIG. 5 (FIG. 10)
Figure 10:
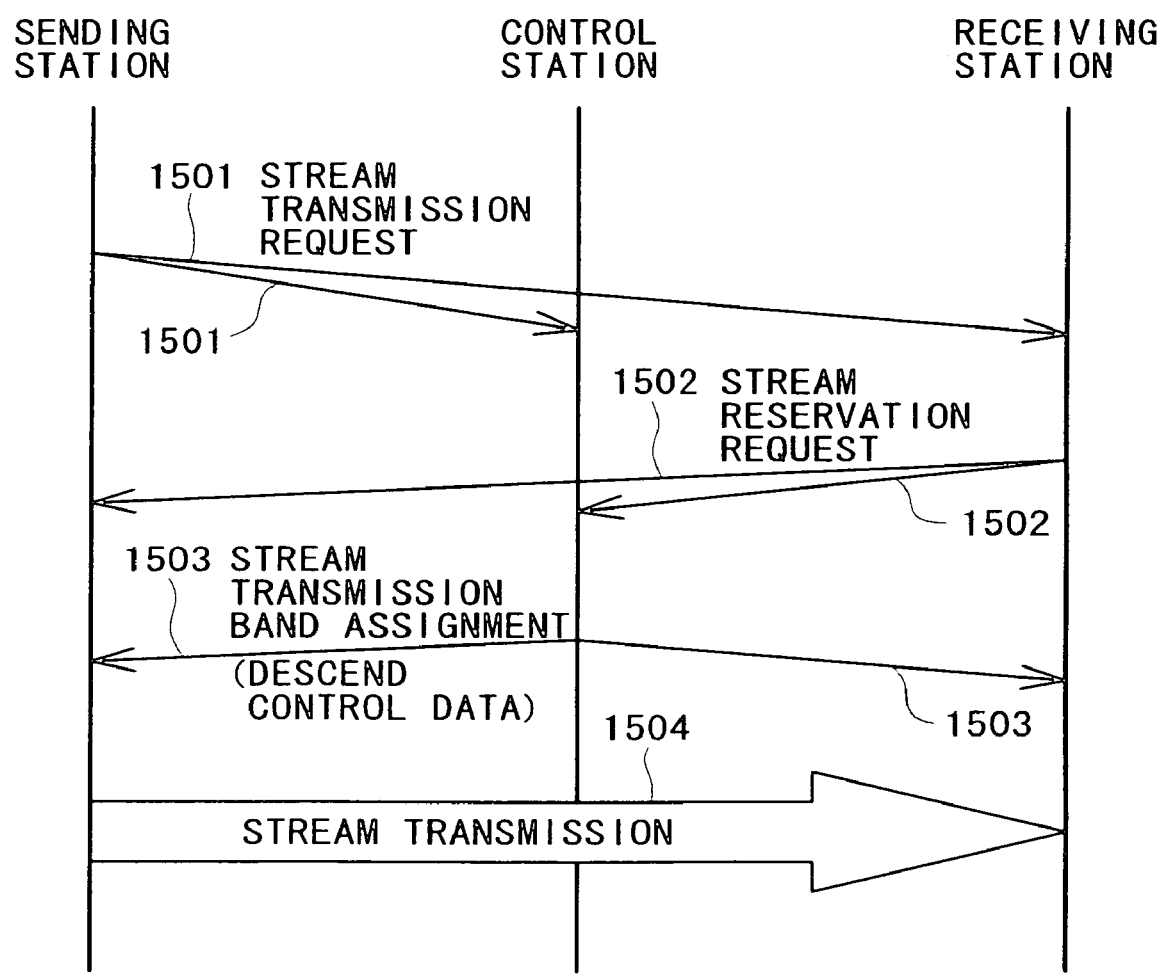
FIG. 10 (FIG. 15) is a diagram showing an example of sequence which covers up to stream transmission following band reservation.

FIG. 6 (FIG. 11) shows an example of the form of transmission frame which can be applied to the data transmission sequence shown in FIG. 5 (FIG. 10). The arrow pointing at both ends indicates the span of transmission frame, which begins with a descend control data indication section 1101 and ends immediately before the next descend control data indication section 1108. The descend control data indication section 1101 at the top of the frame contains common data of the network, and it may include data of the band to be assigned to the transmission set (data transmission request, parameter data and information transmission as will be explained later).

Subsequently, the sending station sends a data transmission request 1102 to the receiving station.

On receiving the data transmission request 1102, the receiving station sends parameter data 1103 to the sending station.

The sending station, which has received the parameter data 1103, implements information transmission 1104 in accordance with the parameter in the parameter data 1103.

In case the frame is allowed of band, a transmission set (data transmission request 1105, parameter data 1106 and information transmission 1107) for another information transmission takes place.

Parameter Data Packet

Figure 7:
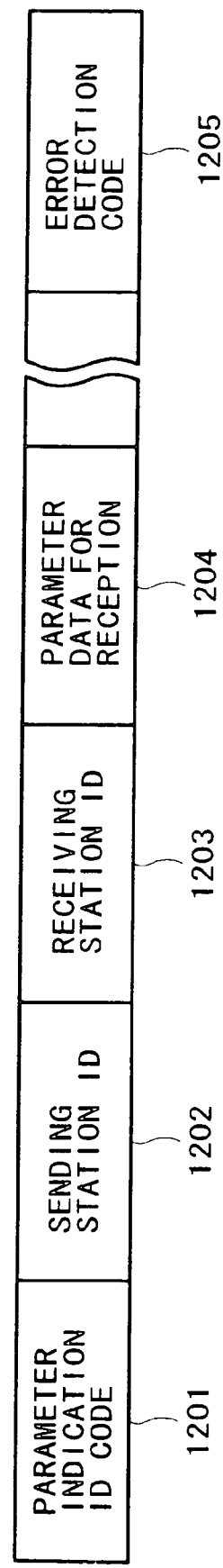
FIG. 7 (FIG. 12) is a diagram showing an example of the form of parameter data packet.

FIG. 7 (FIG. 12) shows an example of the form of packet which is used for the above-mentioned data transmission request 1102 (will be called parameter data packet).

The parameter data packet consists of an ID code 1201 for indicating it to be a parameter data packet, a sending station identifier 1202 for indicating an information sending station, a receiving station identifier 1203 for indicating an information receiving station, and parameter data (number of times of integration) 1204. An error detection code (CRC) 1205 may be added.

Operation of Sending Station

Figure 13:
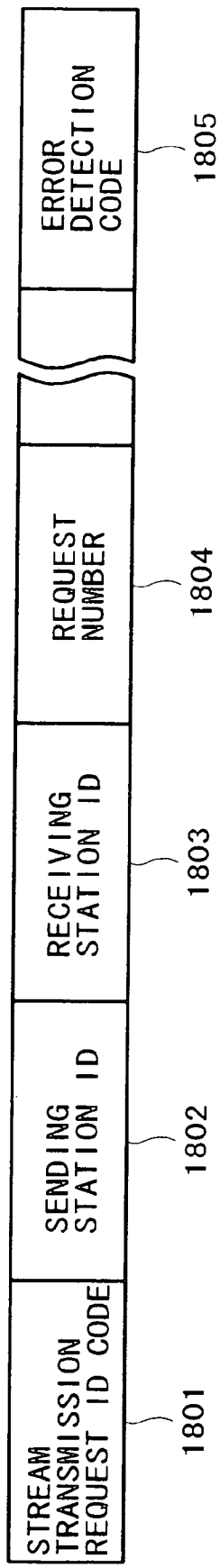
FIG. 13 (FIG. 18) is a diagram showing an example of the form of stream transmission request packet.

Next, the operation of the sending station will be explained with reference to the flowchart of FIG. 8 (FIG. 13).

The controller 33 judges based on the checking of incoming information from an external appliance (not shown) connected to the interface 31 of the wireless transmission unit as to whether or not information transmission is necessary: (step 131).

On judging the necessity of information transmission, the controller 33 operates on the UWB transmitter to send a data transmission request to the receiving station: (step 132).

The controller 33 operates on the UWB transmitter 36 (or the UWB receiver 82? of the wireless reception unit) to check the reception of parameter data from the receiving station: (step 133). On receiving the parameter data, the controller 33 extracts from the parameter data the parameter used for the spreading process of information transmission, and sets the parameter value as spreading factor (number of times of repetition of spread code) to the spreading processor 35: (step 134).

The controller 33 controls the spreading process for the information bit based on the established spreading factor and controls the information transmission: (step 135). The operation of the sending station completes.

Operation of Receiving Station

Figure 9:
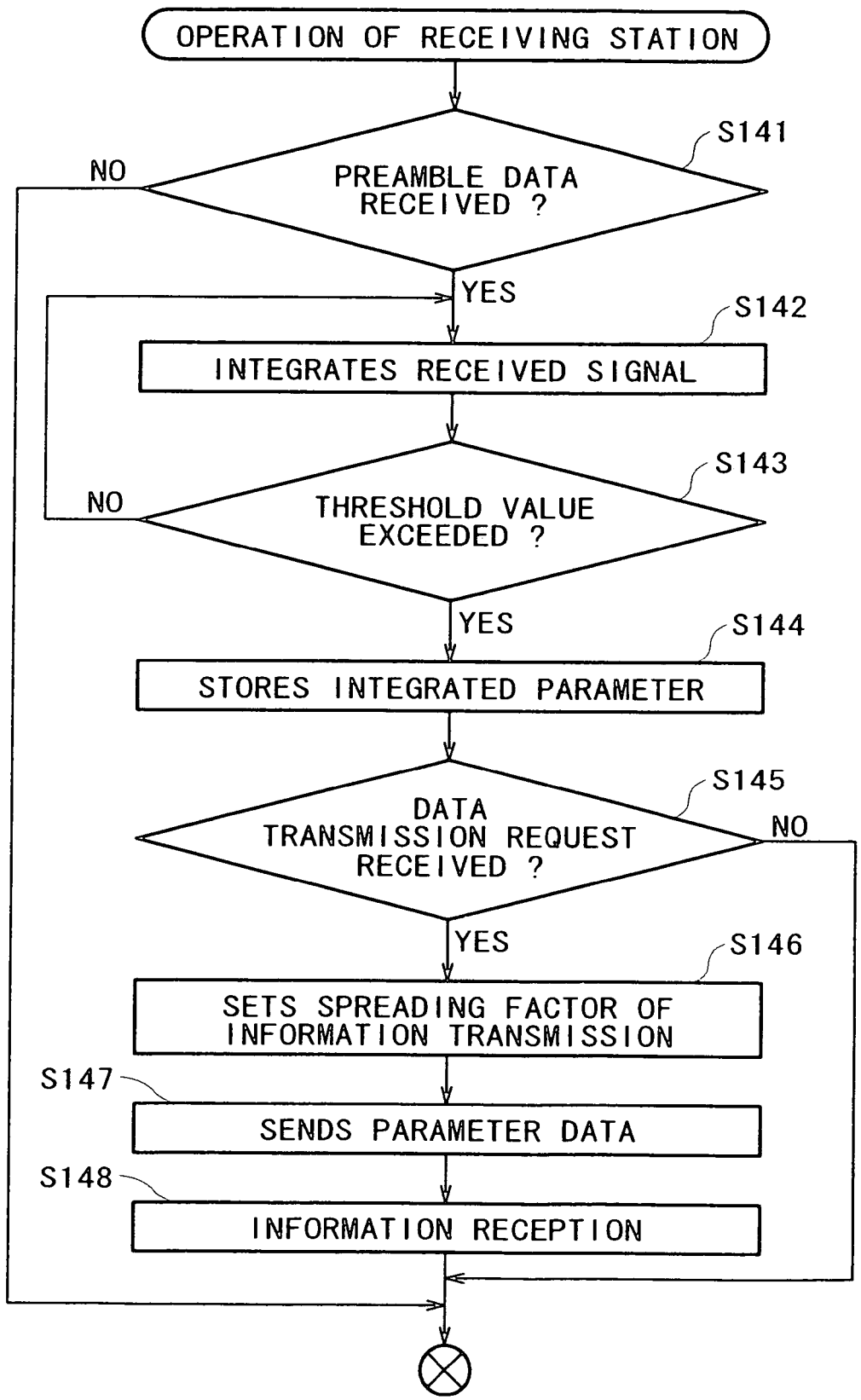
FIG. 9 (FIG. 14) is a flowchart showing the information receiving operation of the receiving station.
Figure 14:
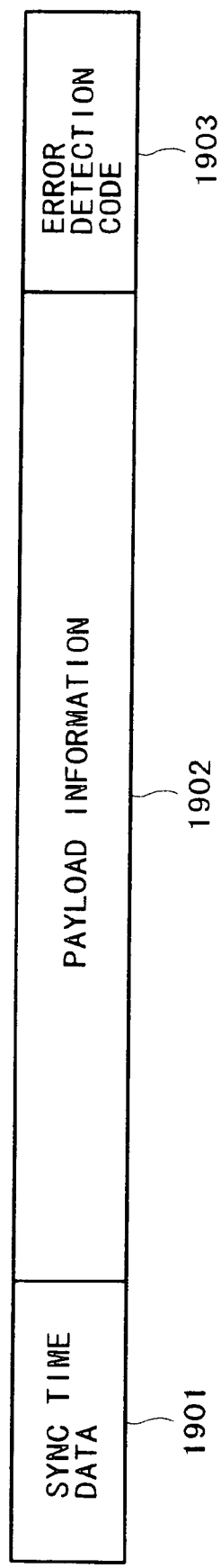
FIG. 14 (FIG. 19) is a diagram showing an example of the form of stream transmission packet.

Next, the operation of the receiving station will be explained with reference to the flowchart of FIG. 9 (FIG. 14).

The controller 84 of the wireless reception unit of the receiving station operates on the UWB receiver 82 to check the reception of a certain preamble from other station through the antenna 81: (step 141).

On confirming the reception of preamble, the controller 84 operates on the UWB receiver 82 to extract the information bit by de-spreading a certain code of the received signal.

At this time, the integration process takes place across the spread code length until a certain information bit is obtained: (step 142). During the integration process, the controller 84 judges at step 143 as to whether the result of integration process has exceeded the specified threshold value. If it does not exceed the threshold value, the sequence returns to the step of integration process (step 148). On finding the value in excess of the threshold value, indicative of a number of times of integration enough to demodulate the received signal, the sequence proceeds to step 144 to store the integrated parameter and writes it in the parameter indication section.

Step 145 judges whether or not data which is received next to the preamble is data transmission request. If it is found to be data of transmission request, step 146 sets the above-mentioned number of times of integration as parameter of the spreading process of the sending station. Step 147 sends the parameter data to the sending station. The receiving station further sets the number of times of integration as de-spreading factor of information transmission. Based on the de-spreading factor, the receiving station produces a de-spread code to implement the reception process when it receives information from the sending station: (step 148). The operation of the receiving station completes.

Advantage of this Embodiment

Based on the variation of spread code used for the wireless communication system depending on the state of linkage for example, it is advantageous for accomplishing a wireless transmission method which meets the system scalability.

This wireless transmission method facilitates the determination of transmission parameter based on the exchange of parameter data prior to the information transmission, and the wireless transmission method which performs wireless transmission based on the optimal parameter and uses the wireless transmission path effectively can be accomplished.

Based on the transmission of transmission request data with a low-speed information bit from the sending station, the information receiving station can evaluate the parameter of information transmission (number of times of integration for retrieving information of one bit).

The sending station, which receives parameter data from the receiving station, can know the availability of transmission path accordingly.

Second Embodiment

Next, the second embodiment will be explained. In this embodiment, parameter data is sent from the receiving station to the sending station by way of the control station, in contrast to the previous embodiment in which parameter data is sent directly from the receiving station to the sending station.

Sequence for Controlling Information Transmission Rate

First, a sequence for controlling the information transmission rate based on this embodiment will be explained.

FIG. 10 (FIG. 15) shows an example of sequence which covers from band reservation up to stream transmission.

The sending station, when it has made a judgement of the need of stream transmission, sends a stream transmission request 1501 to the receiving station and control station. The stream transmission request 1501 is sent at a low transmission rate (e.g., nominal transmission rate shown in FIG. 4) in the form of asynchronous transmission packet, for example, which will be explained later.

The receiving station, which has received the stream transmission request 1501, estimates the number of times of integration by which the specified threshold value is reached for the signal. The receiving station sends a stream reservation request 1502 to the sending station and control station. The stream reservation request 1502 has a form of asynchronous transmission packet including a parameter indicative of the number of times of integration for example.

On receiving the stream reservation request 1502, the control station judges based on the specified parameter as to whether it is possible to assign a band such that part (time) of wireless transmission frame span can be used repeatedly for frame spans for the stream transmission. In case band reservation for the intended stream transmission is possible, the control station transmits descend control data (stream transmission band assignment) 1503 over the wireless network including the sending station and receiving station.

The sending station, when it has received the stream reservation request 1502, makes a judgement of the need of spreading process in the specified transmission band based on the parameter (number of times of integration) specified in the request 1502, and carries out the stream transmission 1504 based on the parameter (number of times of integration) specified in the stream transmission band specification frame.

Transmission Frame Applicable to this Embodiment

Figure 16:
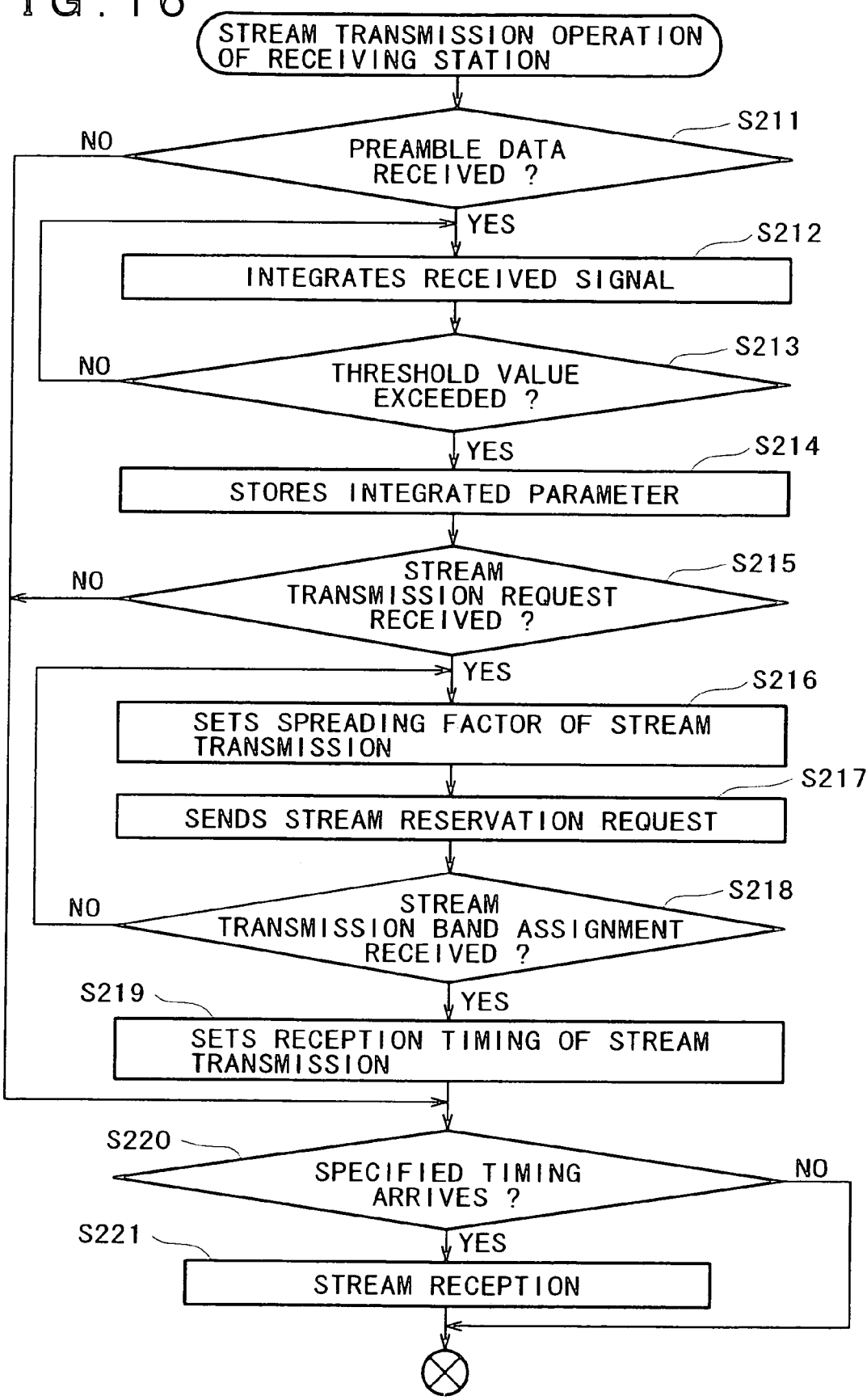
FIG. 16 (FIG. 21) is a flowchart showing the information receiving operation by stream transmission by the receiving station.

Next, an example of the form of transmission frame which can deal with the foregoing sequence will be explained with reference to FIG. 11 (FIG. 16). The transmission frame has a cyclic span FT. The frame is headed by a descend control data indication section 1601 which is common data of the network. This section 1601 is followed by stream transmission sections. The stream transmission sections include two stream transmission sections 1602 and 1603 in this example. These stream transmission sections are assigned by the control station to the requesting sending station, which then has the right of using the same section (time segment) of each frame. The stream transmission section has its length determined variablly depending on the amount of information to be sent.

The stream transmission section is followed by asynchronous transmission sections (three asynchronous transmission sections 1604, 1605 and 1606 in this example). Asynchronous information transmission takes place among arbitrary stations based on the CSMA and CA access schemes. According to the transmission frame of this example, asynchronous transmission 1, asynchronous transmission 2 and asynchronous transmission 3 take place on detecting the absence of information transmission from other stations.

In regard to the transmission rate control scheme for these asynchronous transmissions, the foregoing information transmission sequence shown in FIG. 5 (FIG. 10) can be used.

Packets Used for this Wireless Transmission Method

Figure 17:
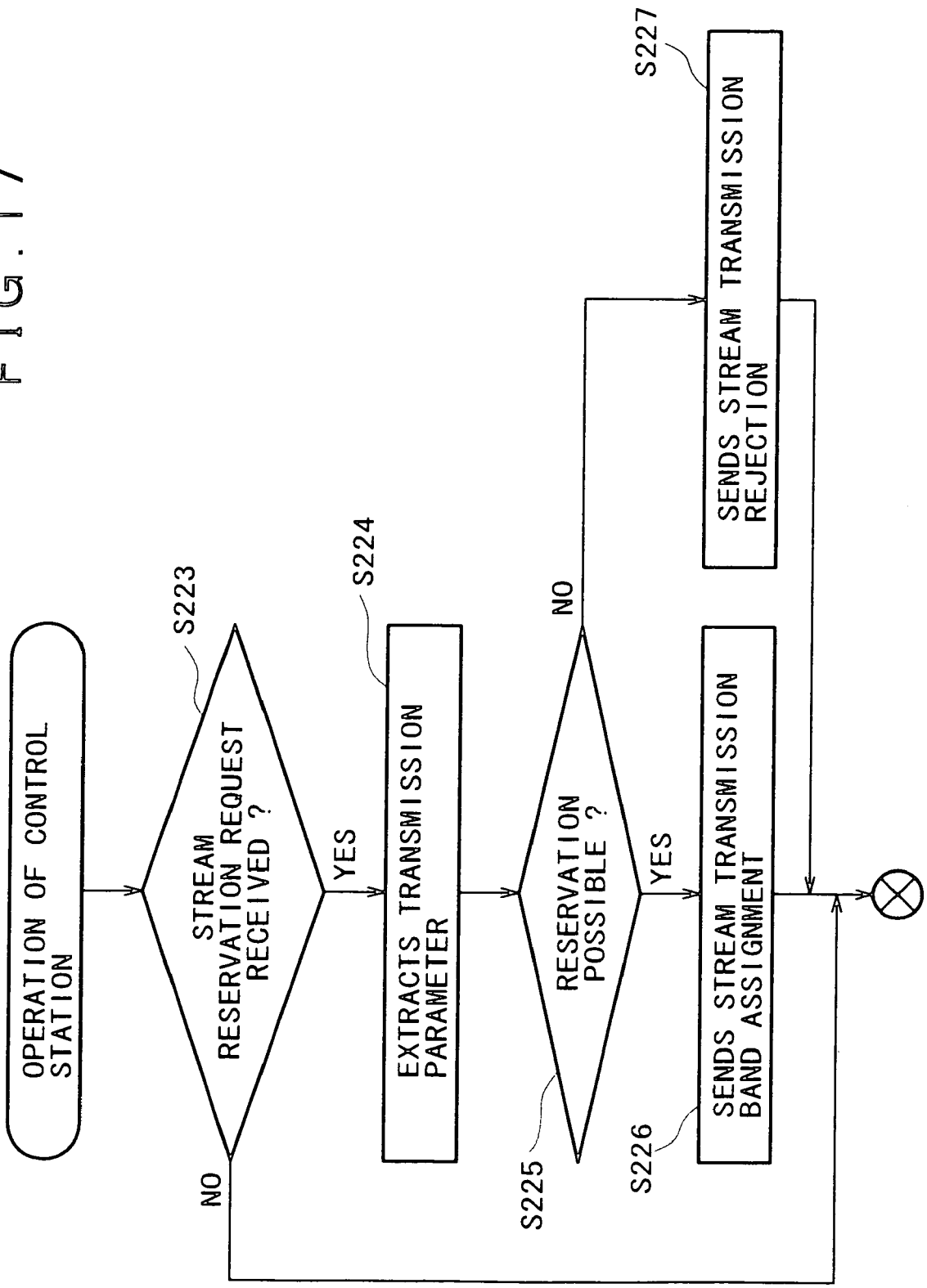
FIG. 17 (FIG. 22) is a flowchart showing the transmission band assigning operation by the control station.
Figure 18:
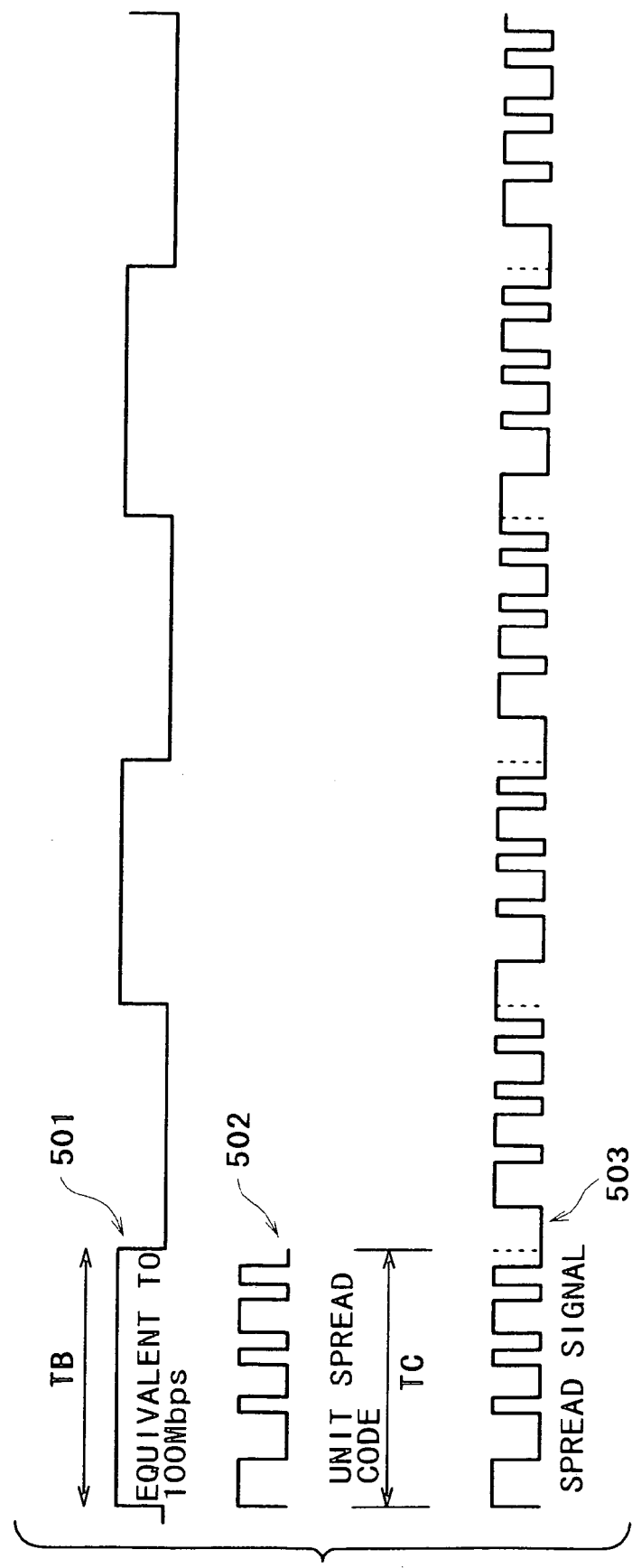
FIG. 18 (FIG. 5) is a waveform diagram showing an embodiment of the formation of spread signal with a transmission rate equal to a nominal transmission rate by using a unit spread code.
Figure 19:
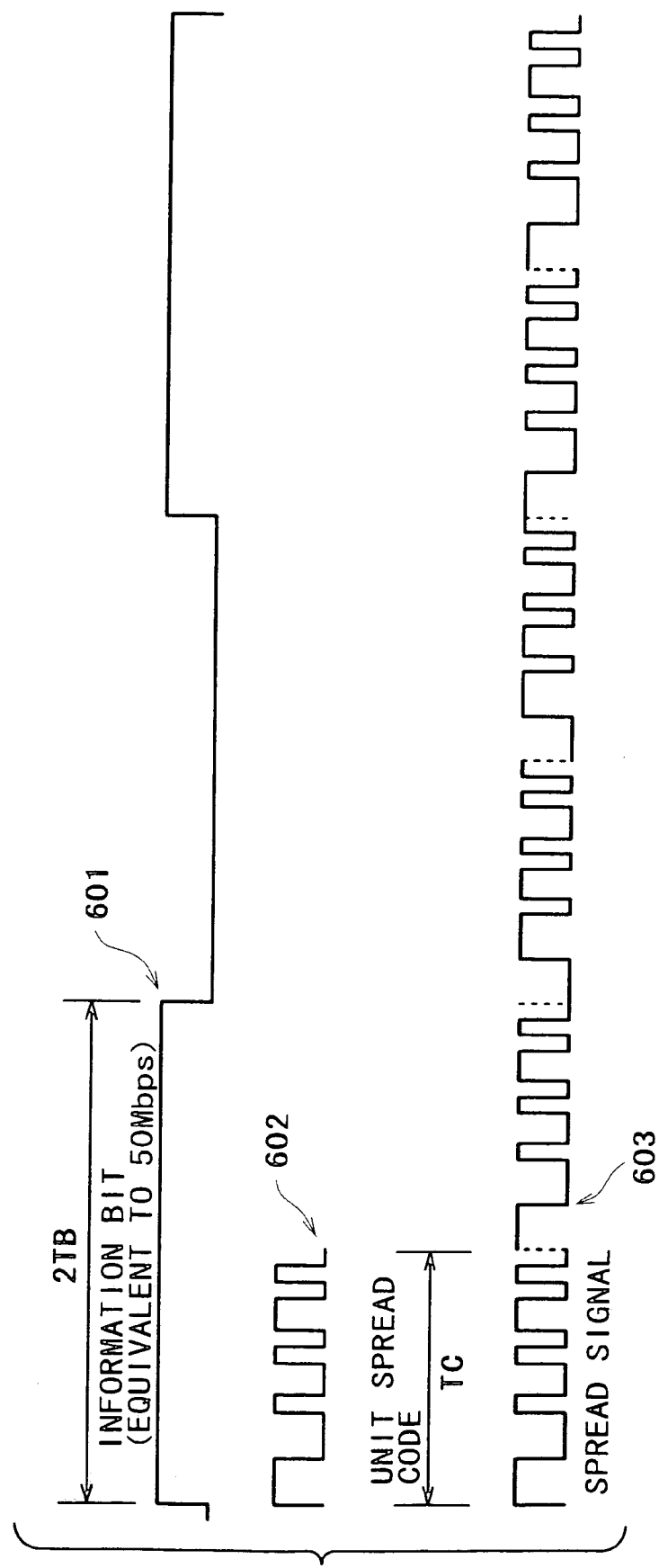
FIG. 19 (FIG. 6) is a waveform diagram showing an embodiment of the formation of spread signal with a transmission rate lower than the nominal transmission rate by using the unit spread code twice repeatedly.

Next, examples of the form of packet used for the wireless transmission method of this embodiment will be explained with reference to FIG. 12 through FIG. 14 (FIG. 17 through FIG. 19).

Descend Control Data Packet

First, an example of descend control data packet will be explained in connection with FIG. 12 (FIG. 17). The descend control data packet is applied to the descend control data indication sections 1101, 1108, 1601 and 1607 shown in FIG. 6 and FIG. 11 (FIG. 11 and FIG. 16) sent from the control station.

The packet consists of a network identifier 1701 which is inherent to the immediate wireless network, frame span synchronization time data 1702 which is equivalent to the time stamp for example, asynchronous transmission section start point data 1703, and stream transmission section start point data 1704. There are a number of stream transmission section start point data 1704 depending on the number of stream transmissions. An error detection code (CRC) 1705 can possibly be added at the end of packet.

Stream Transmission Request Packet

FIG. 13 (FIG. 18) shows an example of stream transmission request packet. The stream transmission request packet consists of an ID code 1801 indicative of a stream transmission request, a sending station identifier 1802 indicative of a sending station, a receiving station identifier 1803 indicative of a receiving station, and a request number 1804 inherent to the immediate stream transmission request. An error detection code (CRC) 1805 may be added.

This packet may be used commonly for the stream reservation request.

Stream Transmission Packet

Next, an example of stream transmission packet will be explained with reference to FIG. 14 (FIG. 19). The stream transmission packet is applied to the packet which is transmitted by being contained in the stream transmission section. The packet consists of synchronization time data 1901 which is equivalent to the time stamp for indicating the contents of packet, and payload information 1902 which is the content of information. An error detection code (CRC) 1903 may be added.

Figure 12:
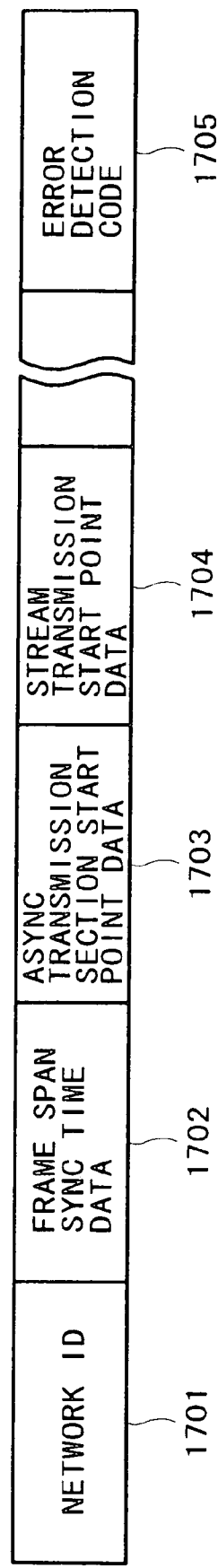
FIG. 12 (FIG. 17) is a diagram showing an example of the form of descend control data packet.

These packets shown in FIG. 12 through FIG. 14 (FIG. 17 through FIG. 19) are expedient to explain the embodiment of invention, and the packets can actually be formed to include other data in need.

Operation of Communication Stations

Figure 20:
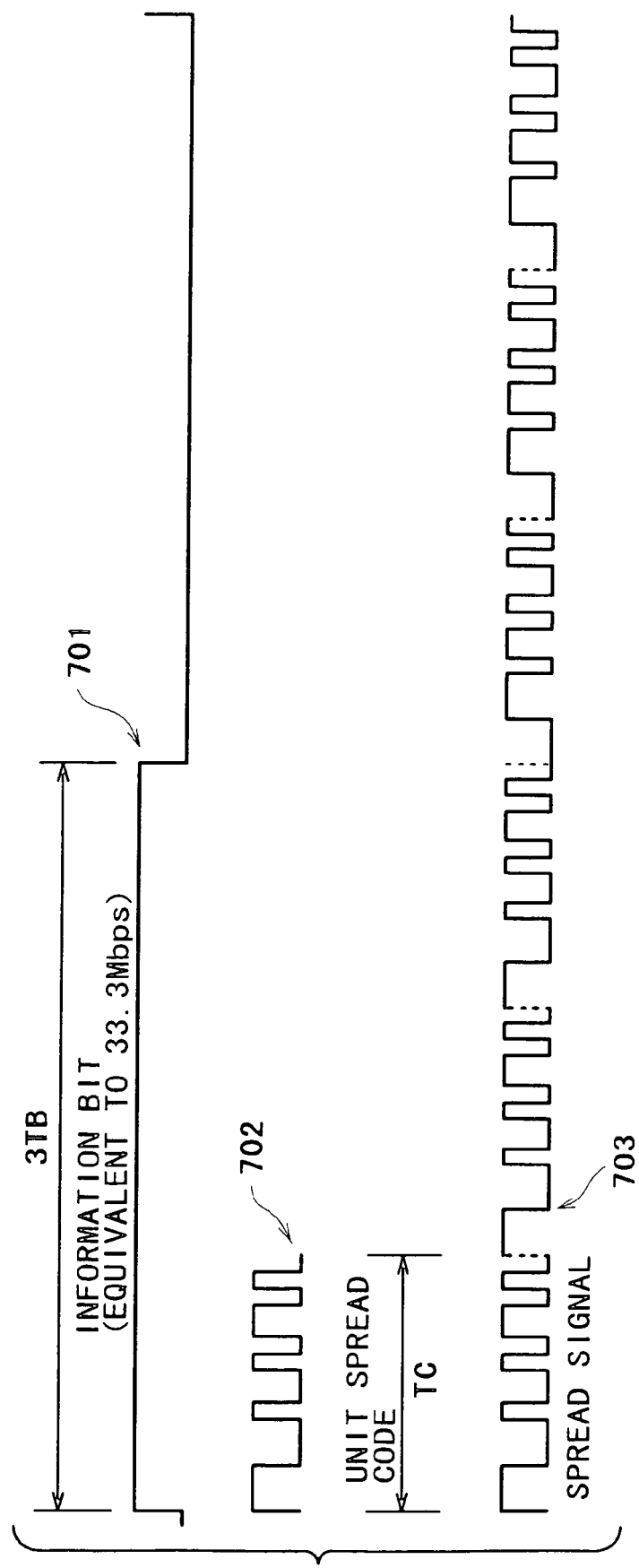
FIG. 20 (FIG. 7) is a waveform diagram showing an embodiment of the formation of spread signal with a transmission rate lower than the nominal transmission rate by using the unit spread code three times repeatedly.
Figure 21:
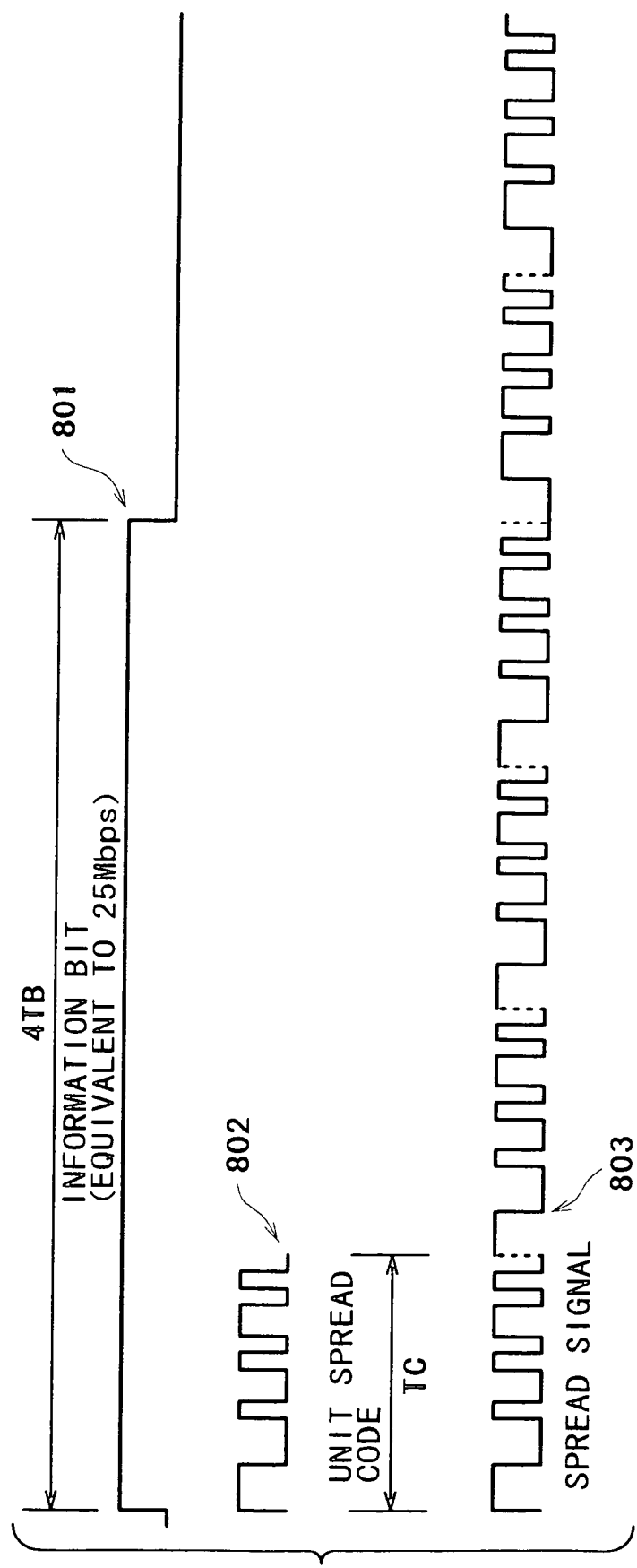
FIG. 21 (FIG. 8) is a waveform diagram showing an embodiment of the formation of spread signal with a transmission rate lower than the nominal transmission rate by using the unit spread code four times repeatedly.
Figure 22:
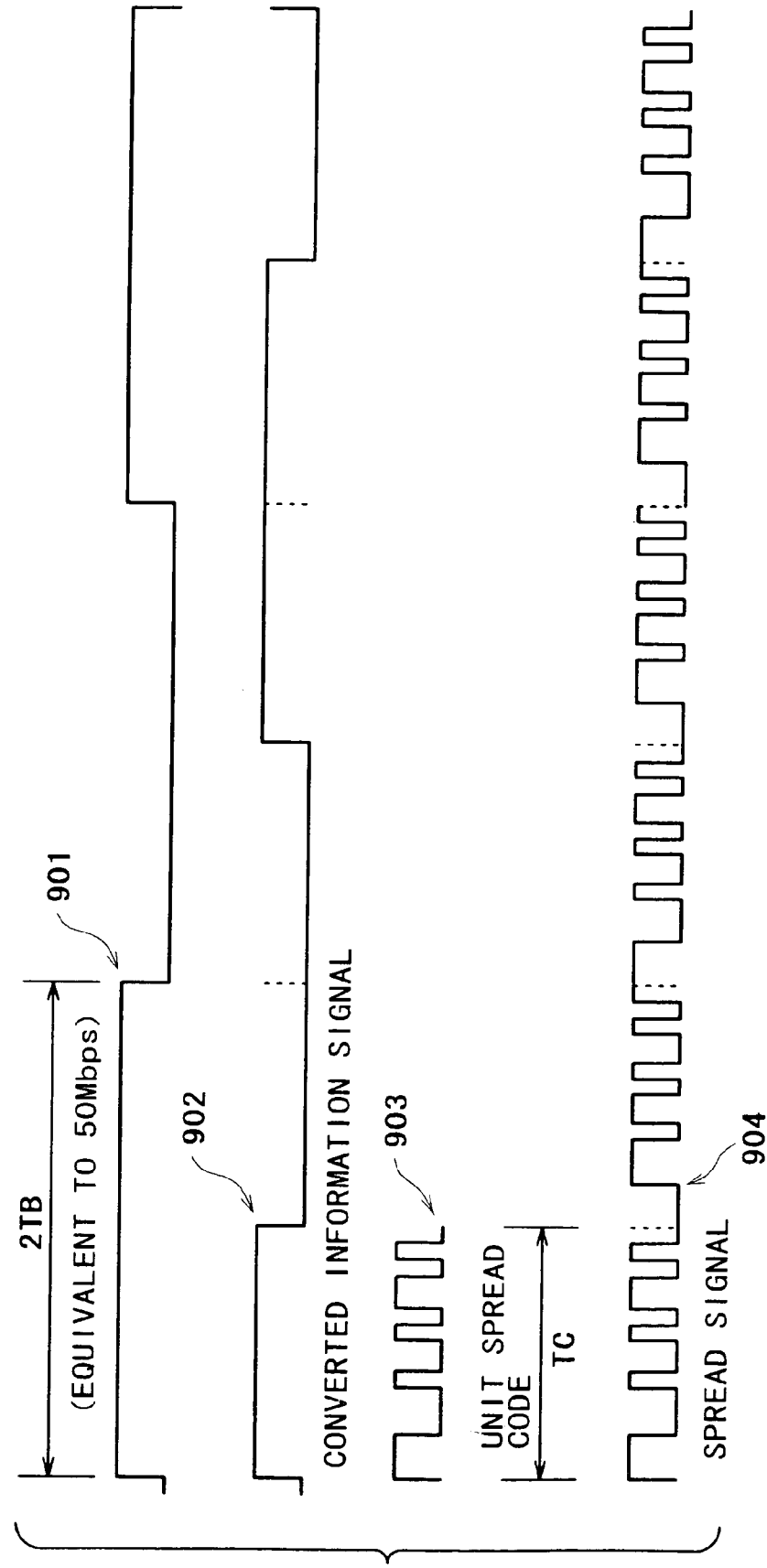
FIG. 22 (FIG. 9) is a waveform diagram showing a variant embodiment derived from the embodiment shown in FIG. 18 (FIG. 5)

Next, the operation of the communication stations (sending station, receiving station and control station) will be explained with reference to FIG. 15, FIG. 16 and FIG. 17 (FIG. 20, FIG. 21 and FIG. 22).

Operation of Sending Station

Figure 15:
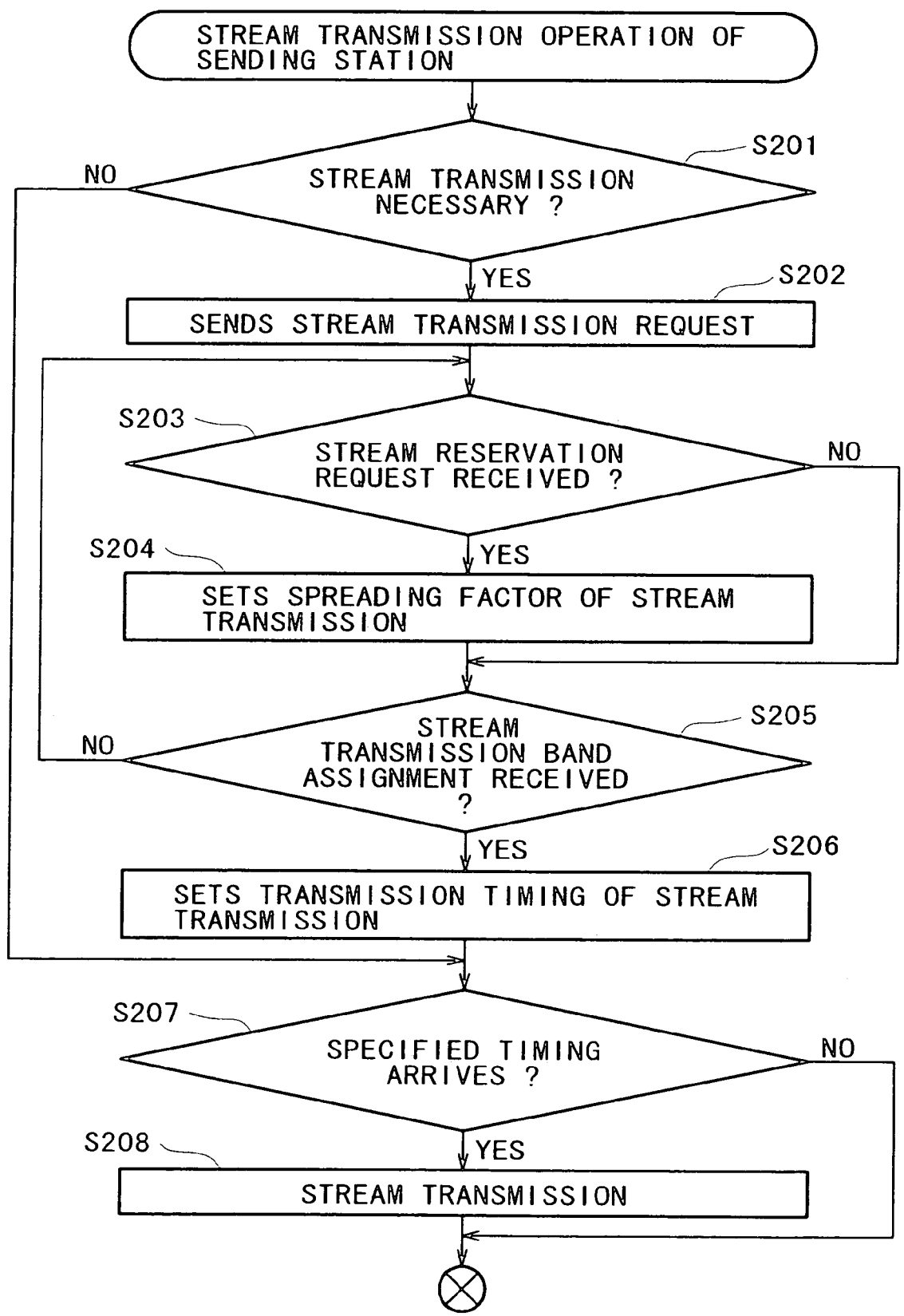
FIG. 15 (FIG. 20) is a flowchart showing the information transmission operation by stream transmission by the sending station.

FIG. 15 (FIG. 20) shows by flowchart the information stream transmission operation based on the foregoing transmission control method performed by the sending station.

When there is incoming information from an external appliance (not shown) which is connect to the interface 31 of the wireless transmission unit, the controller 33 judges as to whether or not stream transmission is necessary: (step 201). The judgement of the need of stream transmission can be based on the quantity or type of information. If stream transmission is necessary, the controller 33 operates on the UWB wireless transmitter 36 to send a stream transmission request: (step 202).

Subsequently, the controller 33 checks the reception of a stream reservation request from the receiving station: (step 203). On receiving a stream reservation request, the controller 33 of the sending station extracts the parameter (number of times of integration) for the spreading process of information to be stream-transmitted out of the stream reservation request, and sets the parameter value as spreading factor to the spread processor 35: (step 204).

The controller 33 of the sending station further checks the reception of the stream transmission band assignment from the control station: (step 205). The stream transmission band assignment may be included in the descend control data packet transmitted over the network.

On receiving this data, the controller 33 of the sending station sets the transmission timing of stream transmission to the UWB wireless transmitter 36: (step 206). The controller 33 checks the arrival of specified timing: (step 207), and feeds the information from the buffer 32 to the spreading processor 35 and to the UWB wireless transmitter 36 for stream transmission only in the case of arrival of timing: (step 208). The operation of the sending station completes.

Operation of Receiving Station

Next, the operation of the receiving station will be explained with reference to FIG. 16 (FIG. 21). FIG. 16 (FIG. 21) shows by flowchart the information receiving operation by the receiving station which performs stream transmission based on this embodiment.

The controller 84 of the receiving station operates on the UWB wireless receiver 82 to check the incoming of a certain preamble from other station through the antenna 81: (step 211).

On receiving the preamble, the controller 84 operates on the UWB receiver 82 to de-spread a certain code of the received signal thereby to obtain the information bit. At this time, the integration process takes place across the spread code length until a certain information bit is obtained.

During the integration process, the controller 84 judges at step 213 as to whether the result of integration process has exceeded a certain threshold value. If it does not exceed the threshold value, the sequence returns to the step of integration process (step 212). On finding the value in excess of the threshold value, indicative of a number of times of integration enough to demodulate the received signal, the sequence proceeds to step 214 to store the integrated parameter and write it in the parameter indication section.

Next, the controller 84 judges as to whether the received data is stream transmission request: (step 215). If it is a stream transmission request, the controller 84 sets the parameter resulting from the integration of step 214 as de-spreading factor (number of times of integration) of information transmission used by the self station: (step 216), and further sends it, by inclusion in the stream reservation request as parameter of spreading process of the sending station, to the sending station and control station: (step 217).

Next, the controller 84 checks the reception of stream transmission band assignment from the control station: (step 218). The stream transmission band assignment maybe included in the descend control data transmitted over the network. On receiving the data, the controller 84 sets the reception timing of stream transmission: (step 219).

Next, the controller 84 checks the arrival of specified timing: (step 220), and implements the receiving process of stream information: (step 221). The operation of the receiving station completes.

Operation of Control Station

Next, the operation of the communication station which functions as control station will be explained. FIG. 17 (FIG. 22) shows by flowchart the operation of transmission band assignment by the control station.

The control station checks the reception of a stream reservation request from the receiving station: (step 223). On receiving the request, the control station extracts the transmission parameter including the spreading factor (number of times of integration) necessary for the band assignment: (step 224), and thereafter judges based on the transmission parameter and band allotment in the wireless network as to whether the reservation of stream transmission is possible: (step 225). If reservation is possible, the control station writes the communication timing data as stream transmission band assignment in the descend control data, and sends the data over the network: (step 226). Otherwise, if reservation is not possible, the control station writes the rejection of stream transmission in the descend control data, and sends the data over the network: (step 227).

Besides the transmission of stream transmission band assignment by use of the descend control data, band assignment data maybe sent to the sending station and receiving station indivisually.

Although the foregoing controllers 33 and 84 of the wireless transmission unit and reception unit operate based on the control programs stored in EEPROMS, an alternative arrangement is to install storage mediums in the transmission unit and reception unit so that these units operate based on the control programs stored in the storage mediums.

These program storage mediums can be floppy disks, CD-ROMs, DVDS, semiconductor memories, or magnetic disks. Alternatively, the control programs can be downloaded into the program storage mediums via a wired or wireless communication means such as LAN, Internet, or digital communication satellite, or loaded through a communication device such as a router or modem.

According to the foregoing embodiments, the spread code used for the wireless communication system varies depending on the state of linkage, whereby a wireless transmission method which meets the system scalability can be accomplishes.

This wireless transmission method facilitates the determination of transmission parameter based on the exchange of parameter data prior to the information transmission, and a wireless transmission method which performs wireless transmission based on the optimal parameter and uses the wireless transmission path effectively can be accomplished.

Based on the transmission of transmission request data with a low-speed information bit from the sending station, the receiving station can evaluate the parameter of information transmission (number of times of integration for retrieving information of one bit).

The sending station, which receives parameter data from the receiving station, can know the availability of transmission path accordingly.

Spreading Process

The spreading process implemented by the spread processor will be explained.

FIG. 18 (FIG. 5) shows by waveform diagram the spreading process for the information signal 501 by use of a prescribed spread code 502. The spreading process uses a 16-bit spread code for each bit of information signal, although this invention is not confined to this example. The spread code 502 has length TC which is equal to bit span TB of the information signal (will be called unit spread code) to produce a spread signal 503. The spread signal 503 has the same waveform as the spread code for information bit "1", or it has the inverted waveform of the spread code for information bit "0".

The transmission rate is 100 Mbps which is equal to the transmission rate of information signal, and it is defined to be the nominal transmission rate. The following explains the spreading process based on transmission rates different from the nominal transmission rate. The information signal has a bit span which is the length of unit spread code multiplied by a positive integer (or the reciprocal of integer) in the following examples, although arbitrary positive numbers instead of integers are also allowed.

Figure 8:
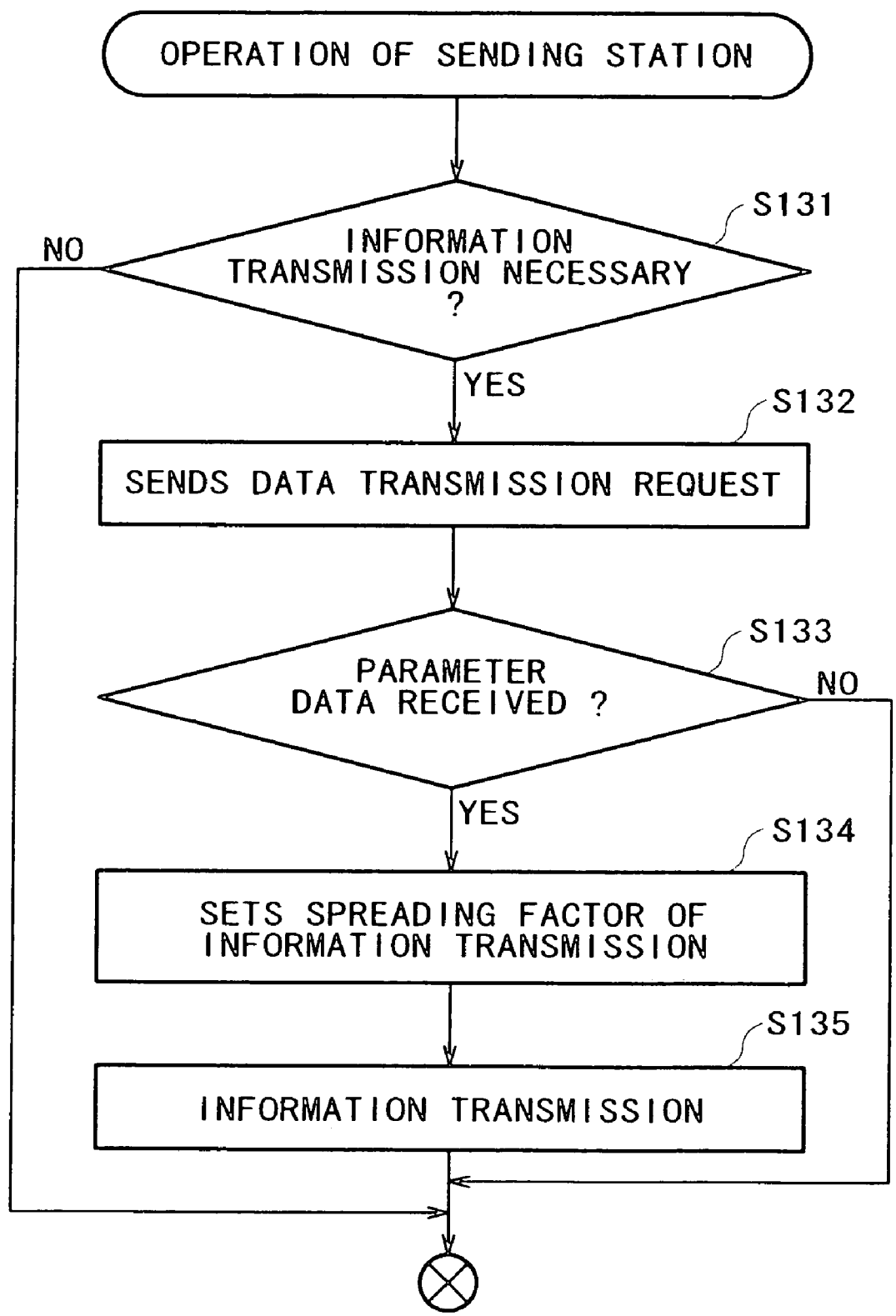
FIG. 8 (FIG. 13) is a flowchart showing the information transmitting operation of the sending station.

Spreading Process Based on a Transmission Rate Lower than the Nominal Transmission Rate The manner of spreading an information signal to a multiple of an integer when necessary for the formation of a spread signal having a transmission rate lower than the nominal transmission rate will be explained in connection with FIG. 19, FIG. 20 and FIG. 21 (FIG. 6, FIG. 7 and FIG. 8).

FIG. 19 (FIG. 6) shows an embodiment of forming a spread signal having a transmission rate lower than the nominal transmission rate by using the unit spread code twice repeatedly. For an information signal 601 having a bit span of 2TB, a unit spread code 602 (same as the unit spread code 502 in FIG. 18 (FIG. 5)) is repeated twice to obtain a spread signal 603 which corresponds to one bit of the information signal 601. Consequently, information signal bit "1" results in two successions of the spread code, while information signal bit "0" results in two successions of the inverted spread code. The resulting transmission rate is half the transmission rate, i.e., 50 Mbps, of the information signal.

Spread Signal with ⅓ Transmission Rate

FIG. 20 (FIG. 7) shows an embodiment of forming a spread signal having a transmission rate lower than the nominal transmission rate by using the unit spread code three times repeatedly. For an information signal 701 having a bit span of 3TB, a unit spread code 702 (same as the unit spread code 502 in FIG. 18 (FIG. 5)) is repeated three times to obtain a spread signal 703 which corresponds to one bit of the information signal 701. Consequently, bit "1" of information signal 701 results in three successions of the spread code, while bit "0" results in three successions of the inverted spread code. The resulting transmission rate is one third of the transmission rate, i.e., about 33.3 Mbps, of the information signal.

Spread Signal with ¼ Transmission Rate

FIG. 21 (FIG. 8) shows an embodiment of forming a spread signal having a transmission rate lower than the nominal transmission rate by using the unit spread code four times repeatedly. For an information signal 801 having a bit span of 4TB, a unit spread code 802 (same as the unit spread code 502 in FIG. 18 (FIG. 5)) is repeated four times to obtain a spread signal 803 which corresponds to one bit of the information signal 801. Consequently, bit "1" of information signal 801 results in four successions of the spread code, while bit "0" results in four successions of the inverted spread code. The resulting transmission rate is a quarter of the transmission rate, i.e., 25 Mbps, of the information signal.

It is generically possible to obtain a spread signal having as low transmission rate as 1/N of the nominal transmission rate by use of an information signal having a bit span that is N times the length of unit spread code.

Variant of Spread Signal with Lower Transmission Rate

FIG. 22 (FIG. 9) shows by waveform diagram a variant of the embodiment shown in FIG. 19 (FIG. 6). According to this variant embodiment, a bit of information signal has its former half and latter half sections represented by the unit spread code and the inverted version thereof.

The spreading process is implemented for a bit of information signal 901 by use of a 32-bit spread code resulting from the repetition of the unit spread code 903 twice. The information signal 901 is rendered the information bit conversion process so as to be converted into another information signal 902 which represents a bit of information signal 901 by two bits. Specifically, information signal bit "1" becomes converted information signal bits "10", and information signal bit "0" becomes converted information signal bits "01".

A unit spread code 903 (same as the unit spread code 502 in FIG. 18 (FIG. 5)) is used for the converted information signal 902 to obtain a spread signal 904. The spread signal 904 for bit "1" of information signal 901 is the unit spread code 903 and the following inverted version thereof, and the signal 904 for bit "0" of information signal 901 is the inverted version of unit spread code 903 and the following unit spread code 903.

An alternative variant embodiment is the information bit conversion process based on a converted information signal "01" for information signal bit "1", and converted information signal "10" for information signal bit "0". In case the transmission rate is changed to 1/N (where N is a positive integer), the information bit conversion process may be designed to represent a bit of information signal by N bits.

As other variant embodiment, the information bit conversion process is designed differently for individual transmission units, with their combination being altered for individual transmission mediums.

Transmission at a Transmission Rate Higher than the Nominal Transmission Rate

The spreading process for communication at a transmission rate higher than the nominal transmission rate will be explained.

Figure 23:
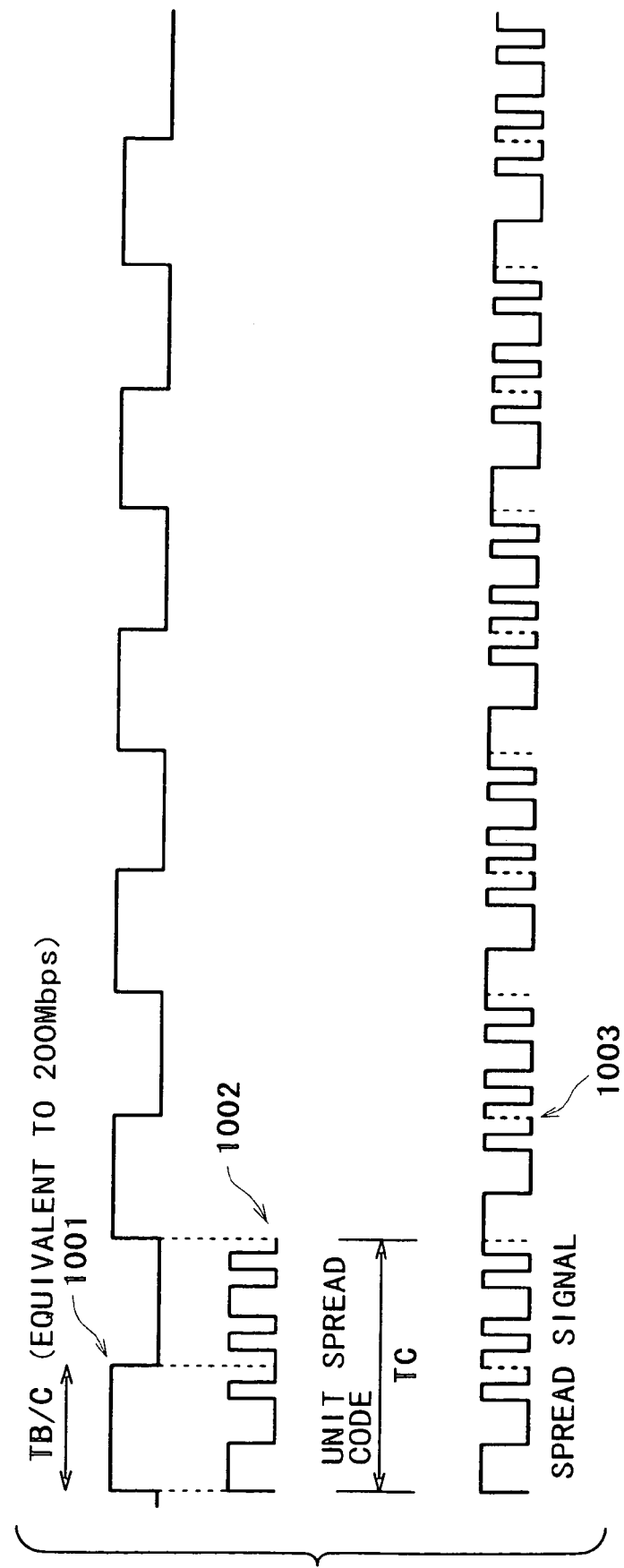
FIG. 23 (FIG. 10) is a waveform diagram showing the case of spreading at a transmission rate which is two times the nominal transmission rate in implementing the spreading process for an information signal by using the unit spread code.

FIG. 23 (FIG. 10) shows by waveform diagram the spreading process at a transmission rate twice the nominal transmission rate for an information signal by use of a unit spread code. The controller 33 of the wireless transmission unit instructs the spreading processor 35 to spread the information signal at a transmission rate twice the nominal transmission rate, and the processor 35 reads the signal out of the buffer 32 and produces an information signal 1001 such that the bit span is half the length of unit spread code 1002 (same as the unit spread code 502 in FIG. 18 (FIG. 5)). The processor 35 implements the spreading process of the information signal 1001 by using the spread code 1002 to obtain a spread signal 1003. The spread signal 1003 results from multiplication of different information bits to the former half and latter half of the spread code 1002.

The information bit can be demodulated from the spread signal by the integration process for the signal throughout the integration term that is half the spread code length.

Wireless Reception Unit

Figure 11:
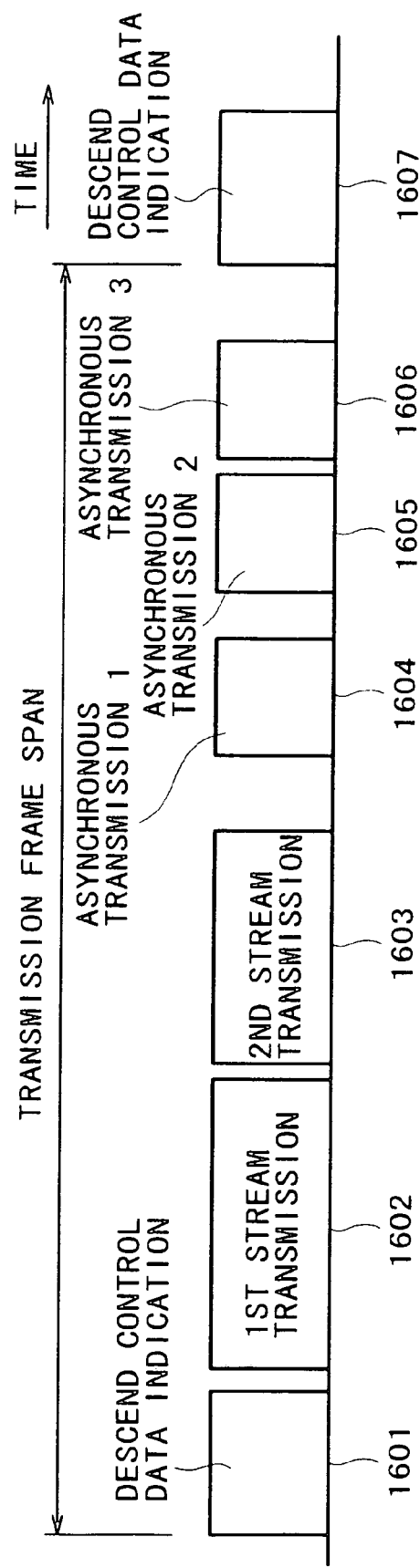
FIG. 11 (FIG. 16) is a diagram showing an example of the form of transmission frame.
Figure 24:
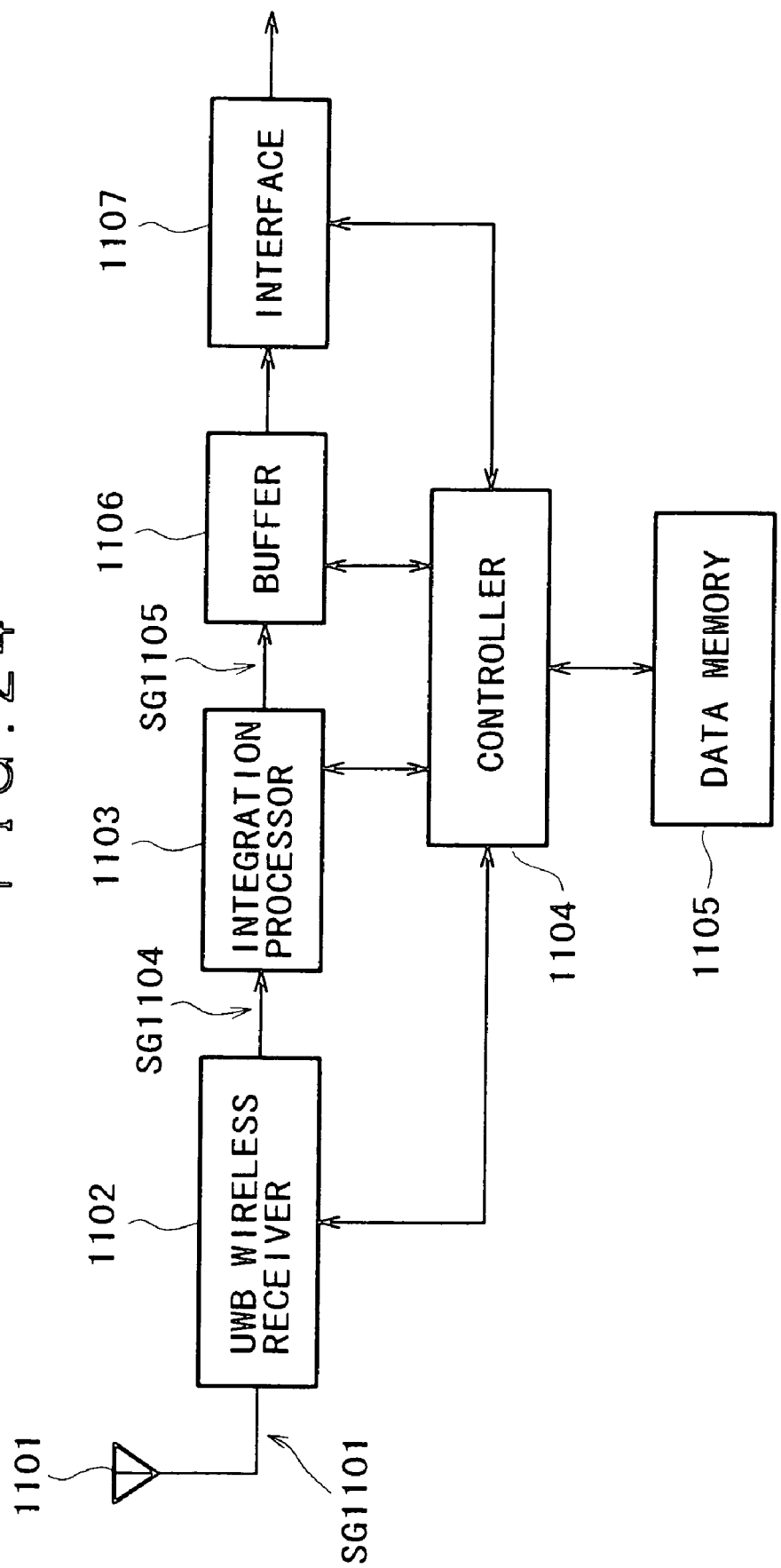
FIG. 24 (FIG. 11) is a block diagram showing an example of the arrangement of the wireless reception unit based on an embodiment.

The arrangement and operation of the wireless reception unit of communication station based on an embodiment of this invention will be explained with reference to FIG. 24 and FIG. 25 (FIG. 11 and FIG. 12). FIG. 24 (FIG. 11) shows the arrangement, and FIG. 25 (FIG. 12) shows the waveform of signals treated by the reception unit.

The wireless reception unit includes an antenna 1101, a UWB wireless receiver 1102, an integration processor 1103, a buffer 1106, an interface 1107, a controller 1104, and a data memory 1105. The antenna 1101 puts a received UWB signal SG1101 into the UWB wireless receiver 1102. The controller 1104 releases a unit spread code to the UWB wireless receiver 1102.

Figure 25F:
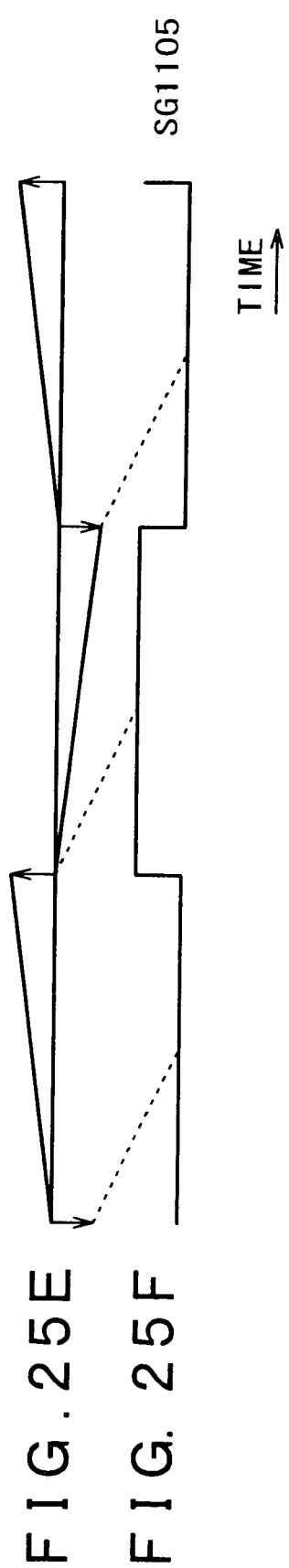
FIG. 25 (FIG. 12) is a waveform diagram of the signals produced or used by the wireless reception unit.

The UWB wireless receiver 1102 multiplies (or superimposes) a pulse train SG1103 (shown by (c) in FIG. 25 (FIG. 12) produced from the unit spread code SG1102 (shown by (b) in FIG. 25 (FIG. 12)) to the UWB signal SG1101, and releases a resulting de-spread signal SG1104 to the integration processor 1103.

The integration processor 1103 implements the integration process for the de-spread signal SG1104 by a specified number of times to extract a demodulated bit signal SG1105. Waveform (e) in FIG. 25 (FIG. 12) indicates the integration process, with integration result values being shown by arrows. One integrating operation lasts from a down-pointing arrow to an up-pointing arrow (or from an up-pointing arrow to a down-pointing arrow) on the waveform (e) in FIG. 25 (FIG. 12).

Data of the number of times of integration, which is exchanged in advance for each wireless linkage and stored in the data memory 1105, is given to the integration processor 1103 in response to the command of the controller 1104. The number of times of integration is determined in correspondence to the multiple or fraction of the information signal bit span with respect to the length of unit spread code treated by the wireless transmission unit. Specifically, for example, when the information signal bit span is twice the length of unit spread code (as in the case of the spreading process shown in FIG. 18 (FIG. 5)), the number of times of integration is determined to be two.

If the specified level is not reached after the cumulation of received information signal by the specified number of times of integration, the integration processor 1103 indicates the fact to the controller 1104. The controller 1104 instructs the UWB wireless receiver 1102 to shift the timing of multiplication of the de-spread code to the UWB signal SG1101.

In case the specified level is not reached following the cumulation of received information signal by the specified number of times of integration even though the adjustment of multiplication timing, the controller 1104 requests the control station (#8) 108 to lower the transmission rate of the sending station. The control station responds to the request to instruct in the descent control data indication section 201 to the sending station to lower the transmission rate. The sending station alters the transmission rate downward in accordance with the descent control data indication section 201.

The buffer 1106 holds the demodulated bit signal SG1105 temporarily, thereby absorbing the time shift in the real-time transmission of information signal. The interface 1107 releases the demodulated bit signal held by the buffer 1106 to an external appliance (not shown) at an intended timing. In consequence, the information signal is reproduced by being demodulated from the UWB signal sent from the sending station.

Third Embodiment

The present invention is also applicable to add-hock networks having no control station. Communication stations and the arrangement of wireless transmission unit and wireless reception unit are identical to those of the first embodiment.

In the wireless communication system of the third embodiment, the sending station indicates the transmission rate to the receiving station, which operates on the controller 1104 to instruct the number of times of integration in accordance with the indicated transmission rate to the integration processor 1103.

The inventive wireless communication system has its spread code length varied depending on the state of linkage, whereby a wireless communication method which meets the system scalability can be accomplished.

The inventive wireless communication system uses a shorter spread code for short-distance communication or a longer spread code for long-distance communication, whereby a wireless communication method which optimizes the communication parameter to match with the distance of linkage can be accomplished.

According to the inventive wireless communication system, a long spread code is represented by a multiple of a basic spread code, whereby a method of obtaining information bits without the need of greatly altering the circuit scale of existing UWB communication system can be accomplished.

According to the inventive wireless communication system, a short spread code is represented by a fraction of a basic spread code, whereby faster UWB communication between near units can be accomplished.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A wireless transmission system formed of a plurality of communication stations and based on spread-spectrum communication, said system comprising:

an information sending station sending a data transmission request to an information receiving station, wherein said receiving station evaluates a number of times of performing an integration process for a received signal of the data transmission request by which an integration result reaches a predetermined threshold value and sends data of an evaluated number of times of integration to said sending station, and wherein said sending station implements information transmission based on the evaluated number of times of integration.

2. A wireless transmission system formed of a plurality of communication stations and based on spread-spectrum communication, said system comprising:

an information sending station sending a data transmission request to an information receiving station, wherein said information receiving station evaluates a number of times of performing an integration process for a received signal of the data transmission request by which an integration result reaches a predetermined threshold value and sends a band reservation request inclusive of data of an evaluated number of times of integration to a control station, wherein said control station, when band reservation is possible, sends back data of band assignment in response to reception of the band reservation request, and said sending station and said receiving station implement information transmission based on the evaluated number of times of integration by using an assigned band.

3. A wireless transmission apparatus comprising:

an integration processor for implementing an integration process for a data signal of a data transmission request; and a controller for operating on said integration processor to evaluate a number of times of integration and for operating on a wireless spread-spectrum transmitter/receiver to transmit data of an evaluated number of times of integration, wherein said controller, on receiving data which is transmitted with the spreading factor derived from the number of times of integration, operates on said integration processor to implement the integration process by the evaluated number of times of integration, thereby to reproduce information bits.

4. The wireless transmission apparatus according to claim 3, wherein said wireless spread-spectrum transmitter/re ceiver is based on an ultra wide band communication scheme.

5. A method of wireless transmission comprising the steps of:

transmitting a data transmission request;

evaluating a number of times of performing an integration process for a received signal of a data transmission request by which an integration result reaches a predetermined threshold value and sending parameter data including an evaluated number of times of integration in response to the data transmission request;

receiving the parameter data including the number of times of integration and determining a spreading factor based on the number of times of integration; and spreading information bits with the determined spreading factor and transmitting spread information bits.

6. The wireless transmission method according to claim 5, wherein said signal of data transmission request is a signal that has been spread with a known spreading factor.

* * * * *